United States Patent [19]
Wada et al.

[11] Patent Number: 5,504,679
[45] Date of Patent: Apr. 2, 1996

[54] CONTROL APPARATUS FOR MOTOR-DRIVEN POWER STEERING SYSTEM OF MOTOR VEHICLE

[75] Inventors: Shunichi Wada; Kazuhisa Nishino; Hirohisa Awa, all of Himeji, Japan

[73] Assignee: Mitsubishi Denki Kabushiki Kaisha, Tokyo, Japan

[21] Appl. No.: 194,059

[22] Filed: Feb. 9, 1994

[30]  Foreign Application Priority Data

Feb. 15, 1993 [JP] Japan .................................. 5-025191
Mar. 16, 1993 [JP] Japan .................................. 5-056008
Mar. 16, 1993 [JP] Japan .................................. 5-056009

[51] Int. Cl.⁶ .............................. B62D 5/04; B62D 5/06
[52] U.S. Cl. ..................... 364/424.05; 180/79.1; 180/142
[58] Field of Search .................. 364/424.05, 424.04, 364/424.03; 180/79.1, 140, 142

[56]  References Cited

U.S. PATENT DOCUMENTS

| | | | |
|---|---|---|---|
| 4,621,327 | 11/1986 | Dolph et al. | 364/424.05 |
| 4,869,334 | 9/1989 | Marumoto et al. | 364/424.05 |
| 4,882,586 | 11/1989 | Dolph et al. | 341/169 |
| 5,202,830 | 4/1993 | Tsurumiya et al. | 364/424.05 |
| 5,259,473 | 11/1993 | Nishimoto | 180/79.1 |
| 5,271,474 | 12/1993 | Nishimoto et al. | 364/424.05 |

FOREIGN PATENT DOCUMENTS

| | | |
|---|---|---|
| 3816254 | 11/1989 | Germany. |
| 4008106 | 9/1990 | Germany. |
| 4215630 | 12/1992 | Germany. |

*Primary Examiner*—Kevin J. Teska
*Assistant Examiner*—Tyrone V. Walker
*Attorney, Agent, or Firm*—Sughrue, Mion, Zinn, Macpeak & Seas

[57] ABSTRACT

A control apparatus for an electric motor-driven power steering system includes a main CPU for arithmetically determining the steering assist torque to be generated by the electric motor and a driving direction thereof on the basis of outputs of a torque sensor and the vehicle speed sensor, a subsidiary CPU for arithmetically determining the driving direction of the motor on the basis of outputs of the torque sensor and the vehicle speed sensor and compare the driving direction signal supplied from the main CPU with a signal of the driving direction determined by the subsidiary CPU to generate a second driving direction signal. A coincidence/discrepancy signal representing coincidence or discrepancy between the motor driving direction signal and the steering torque signal is also supplied to the subsidiary CPU from the main CPU. The subsidiary CPU decides whether the motor driving direction signal coincides with a steering direction signal generated by the subsidiary CPU on the basis of the coincidence/discrepancy signal and the torque sensor signal. In dependence on the decision result, an enable/inhibit signal for enabling or inhibiting supply of the assist torque signal is issued. Each of the main and subsidiary CPUs includes a signal transfer circuit for allowing a signal indicative of the result of the decision to be transferred between the CPUs, and a circuit for interrupting supply of the driving control information to the motor controller when the diagnostic result indication signal indicates occurrence of abnormality in the main or subsidiary CPU.

21 Claims, 12 Drawing Sheets

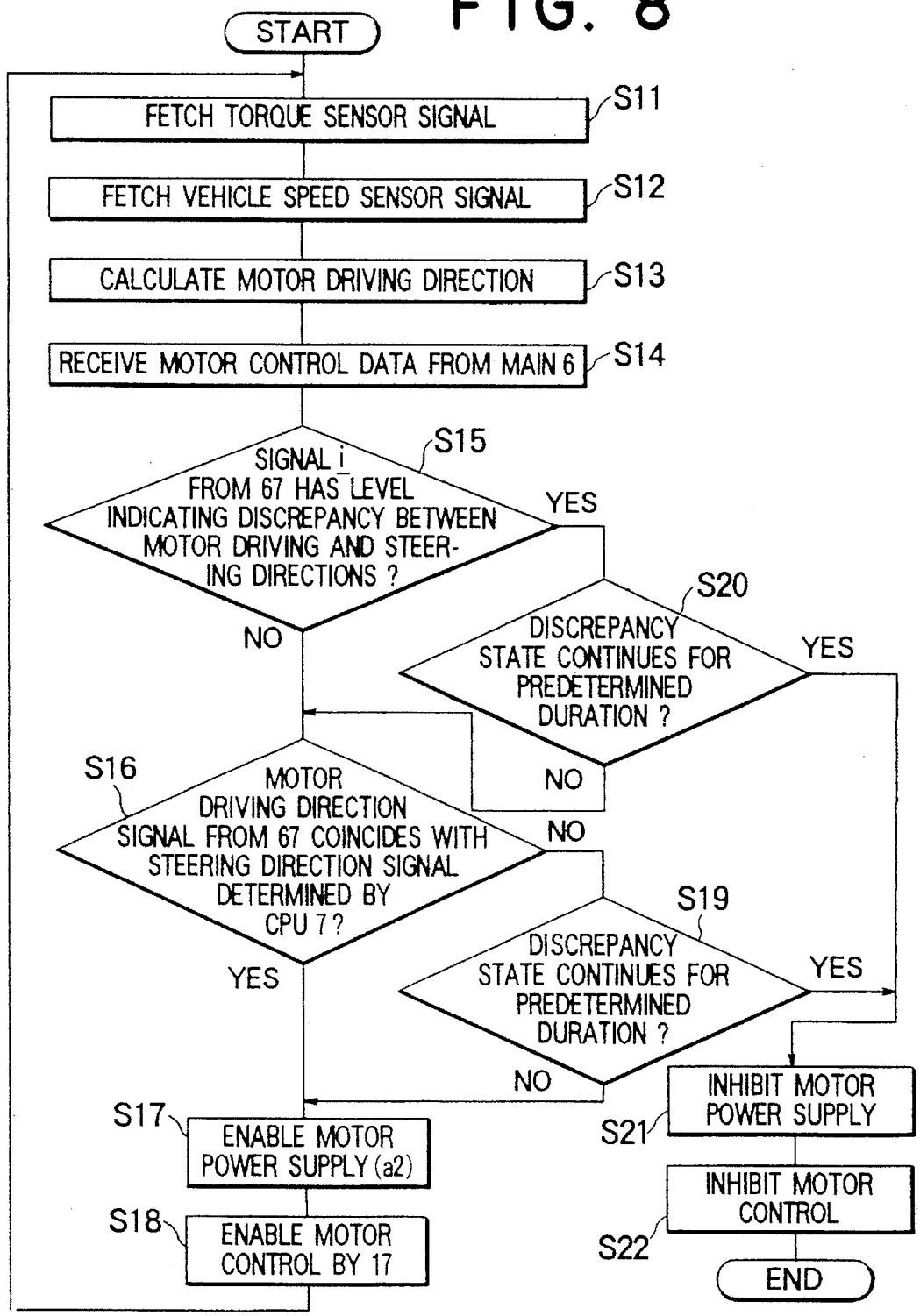

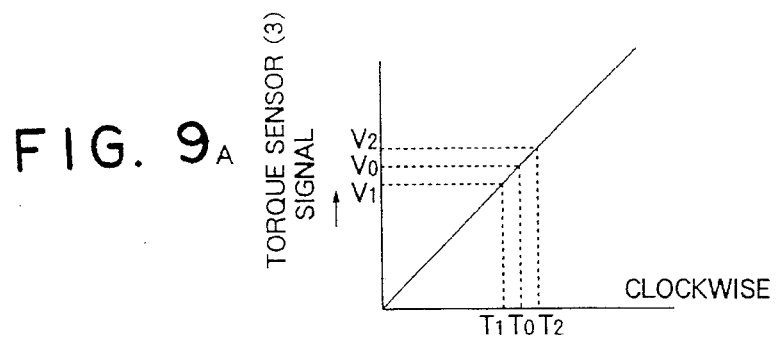
FIG. 9A
FIG. 9B (STEERING CLOCKWISE) D1
FIG. 9C (STEERING COUNTER CLOCKWISE) E1
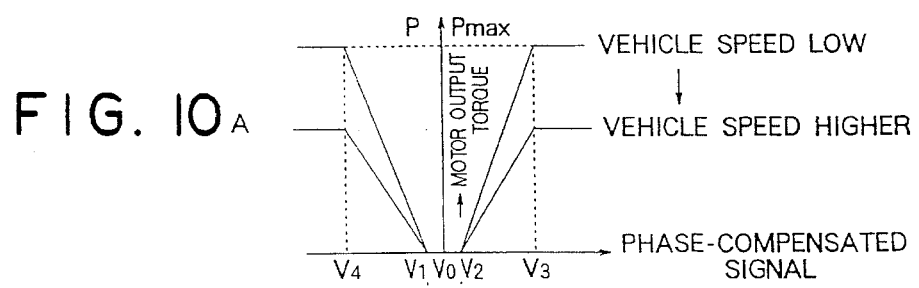
FIG. 10A
FIG. 10B  FORWARD SIGNAL d1,d3
FIG. 10C  BACKWARD SIGNAL d2,d4

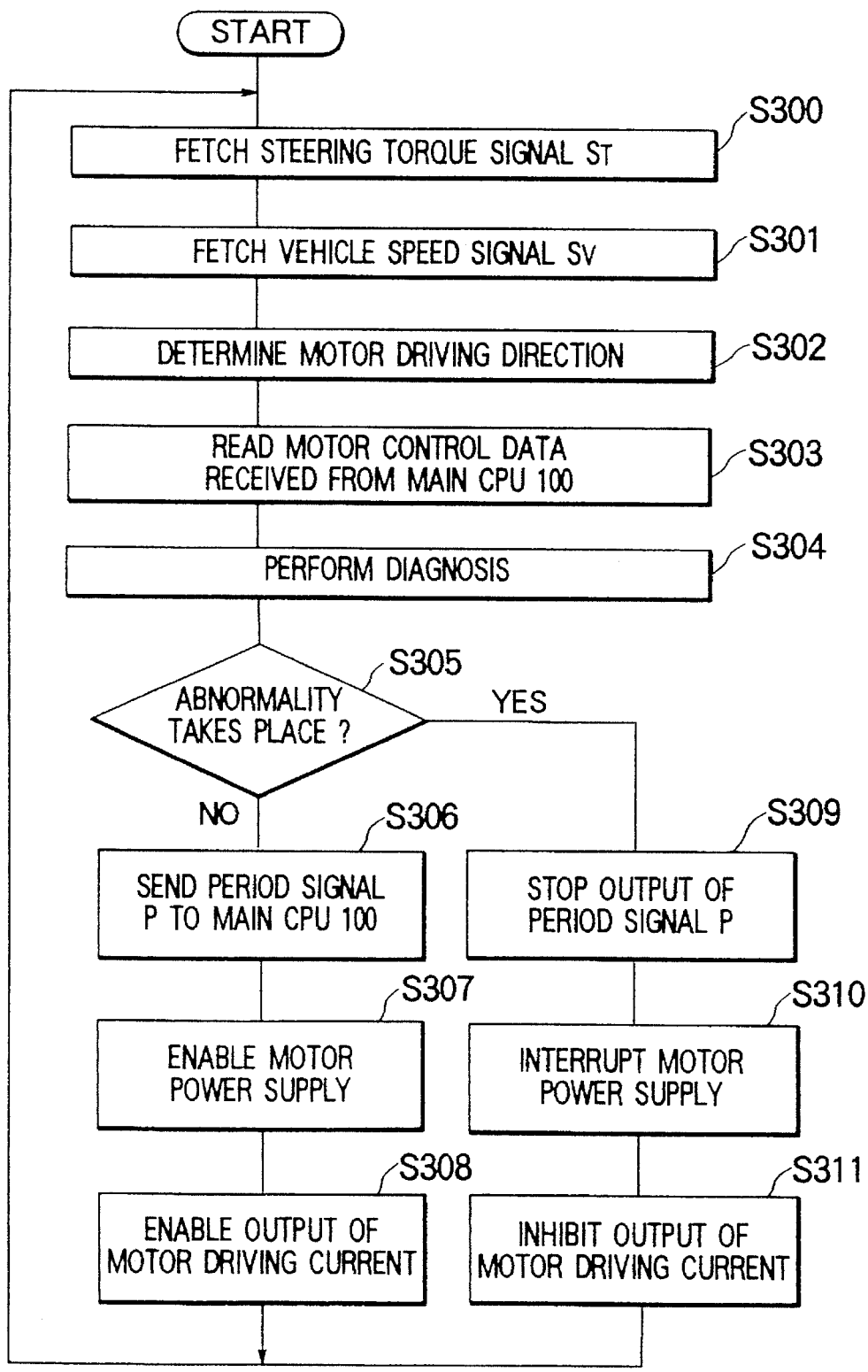

CONTROL APPARATUS FOR MOTOR-DRIVEN POWER STEERING SYSTEM OF MOTOR VEHICLE

BACKGROUND OF THE INVENTION

1. Field of the Invention

The present invention generally relates to a power steering control apparatus for a motor vehicle. More particularly, the invention is concerned with a control apparatus for a motor-driven power steering system which includes an electric motor mechanically coupled to a steering mechanism and electrically connected to a main power supply such as an onboard battery for generating an assist torque for assisting a driver in manipulation of a steering wheel of the motor vehicle.

2. Description of the Related Art

Control apparatuses for the motor-driven power steering system of the type mentioned above are disclosed in, for example, JP-A-H1-267674 (Japanese Unexamined Patent Application Publication No. 267674/1988) and JP-A-H2-249762. In these known power steering control apparatuses, a control apparatus implemented by a single microcomputer is adapted to arithmetically determine an assist torque to be generated by the electric motor as well as the direction in which the motor is to be rotated on the basis of a steering torque applied to a steering wheel by a driver and a vehicle speed of the motor vehicle which are detected by respective sensors.

However, the conventional power steering control apparatuses are not in the position to ensure a high reliability of operation because of possible occurrence of abnormality in the microcomputer and/or peripheral devices thereof, over-run of control software, fixation of output state and/or the like. To cope with this problem, it is conceivable to provide a second or subsidiary processor for arithmetically determining the direction in which the assist torque generating motor is to be rotated on the basis of the steering torque signal indicative of a torque applied to the steering wheel by the driver or a signal obtained through phase compensation of the steering torque signal, wherein the assist torque motor is electrically energized only when the motor driving direction determined by the main processor coincides with the driving direction determined by the subsidiary processor. However, such control system is disadvantageous in that the motor output feedback control performed by the main processor may adversely be affected when the driving direction coincidence/discrepancy decision signal is outputted from the subsidiary processor with a time lag relative to the timing of the torque signal and the direction signal generated by the main processor, because the subsidiary processor is destined to compare the direction signal determined straightforwardly from the steering signal directly inputted to the subsidiary processor and the direction signal determined in precedence by the main processor which includes a phase compensation means for conditioning the output signal from the torque sensor before it undergoes arithmetic operation for determining the assist torque and the driving direction. Under the circumstances, when the steering wheel is rotated in one direction and immediately turned back sharply in the other direction, the assist torque generation by the motor can not follow up the control performed by the control apparatus, possibly incurring outage of the motor and thus uncomfortableness of the steering. This problem may be solved by providing a pair of processors each of high performance so that the time lag mentioned above can be suppressed to a minimum. In that case, the control apparatus will become expensive.

Another problem of the power-steering control apparatus in which two processors are provided for increasing the fail-safe function as compared with the single-processor based control is seen in that when failure or abnormality takes place in the main or subsidiary processor, the steering control operation may fall in the undesirable situation mentioned above in conjunction with the known apparatus.

SUMMARY OF THE INVENTION

In the light of the state of the art described above, it is an object of the present invention to provide a control apparatus for a motor-driven power steering system in which the shortcomings of the known apparatus as well as the problems mentioned above can be mitigated or solved.

Another object of the invention is to provide an apparatus which can ensure a high reliability in the steering assist control and thus increased safety in driving a motor vehicle.

Yet another object of the invention is to provide a steering control apparatus which can be implemented without incurring high costs and thus assure an enhanced cost-performance feature.

It is a further object of the present invention to provide a control apparatus for a motor-driven power steering system including a main processor and a subsidiary processor, which can be protected against erroneous operation even when the steering direction is changed only transiently.

Yet further object of the invention is to provide a steering control apparatus which incorporates a diagnosis function capable of detecting occurrence of abnormality in main and/or subsidiary processor as well as peripheral devices thereof and stopping operation of the assist torque generating motor instantaneously upon occurrence of such abnormality or failure.

In view of the above and other objects which will become apparent as the description proceeds, there is provided according to a first aspect of the present invention a control apparatus for a motor-driven power steering system of a motor vehicle, which includes an electric motor connected to a main power supply source for generating an assist torque for facilitating manipulation of a steering wheel of the motor vehicle, which apparatus comprises a torque sensor for detecting a steering torque applied to a steering mechanism of the motor vehicle to which the electric motor is operatively coupled, a vehicle speed sensor for detecting a vehicle speed of the motor vehicle, a first processor operatively connected to at least the torque sensor and the vehicle speed sensor for arithmetically determining an assist torque to be generated by the electric motor and a driving direction in which the motor is to be driven on the basis of outputs of the torque sensor and the vehicle speed sensor to thereby generate an assist torque signal and a first driving direction signal, respectively, a motor drive control means operatively connected to the first processor for controlling operation of the electric motor in accordance with the assist torque signal and the first driving direction signal supplied from the first processor, a second processor operatively connected to the torque sensor and the first processor for arithmetically determining the driving direction of the motor on the basis of outputs of the torque sensor and the vehicle speed sensor to compare the first driving direction signal supplied from the first processor with a signal indicative of the driving direction determined by the second processor to thereby generate a second driving direction signal, and a logic circuit operatively connected to outputs of the first and second processors and input side of the motor drive control means for enabling control operation thereof when the torque assist signal supplied from the first processor and the second driving direction signal supplied from the second processor logically coincide with each other.

In a preferred mode for carrying out the invention, the control apparatus may further include a constant voltage power supply circuit connected to a main power supply source for supplying an electric power of a constant voltage to the first processor and the second processor, and a motor power supply control circuit for controlling power supply to the electric motor from the main power supply source, wherein the first processor includes first voltage signal generating means for generating a first voltage signal indicative of an output voltage of the constant voltage power supply circuit, the first voltage signal being transferred to the second processor and at the same time outputted to the logic circuit, and wherein the second processor means includes a second voltage signal generating means for generating a second voltage signal indicative of the output voltage of the constant voltage power circuit supplied to the second processor and comparison module for comparing the first voltage signal with the second voltage signal to thereby generate an output signal when the comparison results in coincidence between the first and second voltage signals, and wherein the logic means includes first logical product circuitry for generating a signal for enabling power supply to the electric motor from the main power supply source through the motor power supply control circuit when an output signal of the first logical product circuitry indicates logical coincidence between the first voltage signal supplied from the first processor and the output signal supplied from the second processor.

The motor power supply control circuit mentioned above may be constituted by a switching element which is turned on or off in response to output of the logical product means to thereby allow power supply to the electric motor from the main power supply source only when the output of the first logical product circuitry indicates coincidence between the first voltage signal from the first processor and the corresponding output signal from the second processor.

The electric motor is supplied with electric power from the main power supply source in the form of a pulse current having a duty circle controlled by a switching circuit which in turn is controlled by a pulse width modulation signal generated by the motor drive control means in accordance with the assist torque signal and the driving direction signal supplied from the first processor means when control operation of the motor drive control means is enabled.

The switching circuit includes a pair of first and second switching circuitries for driving exchangeably the electric motor in either one of rotational directions.

In another preferred mode for carrying out the invention, the aforementioned logic circuit may include a second logical means which is comprised of a pair of first and second AND circuits, wherein the first AND circuit receives a first assist torque signal from the first processor which indicates an assist torque to be generated by the electric motor in one rotational direction and a first driving direction signal from the second processor which indicates one rotational direction, the first AND circuit generating a logical product signal for enabling operation of the motor drive control circuit when the first assist torque signal and the first driving direction signal logically coincide with each other, while the second AND circuit receives a second assist torque signal from the first processor which indicates an assist torque to be generated by the electric motor in the other rotational direction which is reverse to the one rotational direction together with a second driving direction signal from the second processor which corresponds to the other rotational direction, the second AND circuit generating a logical product signal for enabling operation of the motor drive control circuit when the second assist torque signal and the second driving direction signal logically coincide with each other.

With the arrangements of the control apparatus according to the first aspect of the invention described above, the supply of the drive enable signal to the motor power supply control circuit as well as the electric power supply thereto is interrupted when discrepancy is detected as the result of comparison between the driving direction of the driving motor determined by the first processor and that determined on the basis of the output of the torque sensor by the subsidiary processor and when a predetermined time has lapsed from the detection of the discrepancy. Thus, reliability of operation of the power steering control apparatus can significantly be enhanced with a simplified and inexpensive circuit configuration. Further, the subsidiary processor which may have a lower processing capability as compared with that of the main processor can be constituted by a commercially available inexpensive CPU chip. In this manner, high security can be ensured for the motor-driven steering control apparatus by virtue of such arrangement that the electric power supply to the driving motor is inhibited with the motor drive control operation being disabled when abnormal situation such as overrun of the main processor or the like disturbance thereof and/or associated peripheral device continue for a predetermined period which exceeds a failsafe period of the power steering system, whereby adverse influence of abnormality or disturbance of the main processor and peripheral devices thereof to the power steering system can positively be suppressed to a possible minimum.

According to a second aspect of the invention, there is provided a control apparatus for a motor-driven power steering system of a motor vehicle, which apparatus comprises a torque sensor for detecting a steering torque applied to a steering mechanism of the motor vehicle to which the electric motor is operatively coupled, a vehicle speed sensor for detecting a vehicle speed of the motor vehicle, a first processor operatively connected to the torque sensor and the vehicle speed sensor for arithmetically determining an assist torque to be generated by the electric motor and a driving direction in which the motor is to be driven on the basis of outputs of the torque sensor and the vehicle speed sensor means to thereby generate an assist torque signal, a motor driving direction signal and a coincidence/discrepancy signal representing coincidence or discrepancy between the motor driving direction signal and a first steering direction signal indicating a direction of the steering torque, a motor drive control means operatively connected to the first processor means for controlling operation of the electric motor in accordance with the assist torque signal and the motor driving direction signal supplied from the first processor, a second processor operatively connected to the torque sensor and the first processor and supplied with the coincidence/ discrepancy signal and the motor driving direction signal from the first processor for thereby making decision as to coincidence or discrepancy state between the motor driving direction signal and a second steering direction signal generated by the second processor as well as decision concerning temporal duration of the discrepancy state, if decided, on the basis of the coincidence/discrepancy signal and output of the torque sensor, to thereby supply to the motor drive control means an enable/inhibit signal for enabling or inhibiting supply of the assist torque signal to the motor drive control means from the first processor in dependence on the result of the above-mentioned decision.

In a preferred mode for carrying out the second aspect of the invention, the second processor may include means for inhibiting at least one of electric power supply to the motor and supply of the assist torque signal to the motor driving circuit when the aforementioned decision results in that the discrepancy state has continued for a duration which exceeds a predetermined value.

Further the first processor may include a motor control arithmetic module for generating the assist torque signal and the motor driving direction signal on the basis of the outputs of the torque sensor and the vehicle speed sensor, a steering torque direction arithmetic unit for generating a first steering direction signal on the basis of the output of the torque sensor independent of the motor control arithmetic module, a motor control output module for supplying the assist torque signal and the motor driving direction signal to the motor drive control means, and a motor control signal transfer module operatively coupled to the outputs of the motor control arithmetic module and the steering direction arithmetic module for sending the motor driving direction signal and the coincidence/discrepancy signal to the second processor, wherein the motor control signal transfer module includes comparison means for comparing the motor driving direction signal supplied from the motor control arithmetic module with the first steering direction signal supplied from the steering torque direction arithmetic module to thereby set the coincidence/discrepancy signal to first or second logical level representing coincidence or discrepancy between the motor driving direction signal and the first steering direction signal.

On the other hand, the second processor may include a motor control data receiving module for receiving the motor driving direction signal and the coincidence/discrepancy signal, a first decision module for deciding whether the coincidence/discrepancy signal is at a level indicating the discrepancy state, a second decision module responsive to decision of the first decision means that the coincidence/discrepancy signal indicates the discrepancy state, to thereby decide whether the discrepancy state has continued longer than a predetermined duration, and an output module for generating a signal for inhibiting at least one of the electric power supply to the motor and supply of the assist torque signal to the motor drive control means when it is decided by the second decision means that the discrepancy state has continued longer than a predetermined duration.

Additionally, the second processor may include a steering direction arithmetic module for generating a second steering direction signal indicative of direction of torque applied to the steering wheel on the basis of output of the torque sensor, a comparison module for comparing the second steering direction signal with the motor driving direction signal supplied from the first processor for thereby deciding whether or not the second steering direction signal coincides with the motor driving direction signal, a third decision module, which is responsive to decision of the comparison module that the second steering direction signal does not coincide with the motor driving direction signal, to thereby decide whether discrepancy state in which the second steering direction signal does not coincide with the motor driving direction signal has continued longer than a second predetermined duration, and an output module for generating a signal inhibiting at least one of electric power supply to the motor or supply of the assist torque signal to the motor drive control means when decision made by the second decision module is affirmative.

Thus, the second and third decision modules cooperate to constitute means for enabling the electric power supply to the motor and the supply of the assist torque signal to the motor drive control means even when the motor driving direction signal and the second steering signal does not coincide with each other, provided that the coincidence/discrepancy signal indicates the discrepancy state.

In the control apparatus according to the second aspect of the invention, a logic circuit may be provided and connected to outputs of the first processor and the second processor and input side of the motor drive control means for enabling control operation thereof when the torque assist signal supplied from the first processor and the second driving direction signal supplied from the second processor means logically coincide with each other.

As will be understood from the foregoing description, by virtue of arrangement of the control apparatus according to the second aspect of the invention, the supply of the enable signal to the motor power supply control circuit and hence the power supply to the motor is inhibited, when the coincidence/discrepancy signal indicating discrepancy continues to be issued from the main processor for a period longer than a predetermined time or when discrepancy between the driving direction signal sent from the main processor and the steering direction signal determined by the subsidiary processor is continuously detected over a time span longer than a predetermined value even when the coincidence/discrepancy signal indicating discrepancy disappears within a shorter period than the predetermined time. Thus, the reliability of operation of the power steering control apparatus can significantly be enhanced with a simplified and inexpensive circuit configuration. The subsidiary processor which may have a lower processing capability than that of the main processor may be constituted by a commercially available inexpensive CPU. In this manner, high security can be ensured for the motor-driven steering control apparatus by virtue of such arrangement that the electric power supply to the driving motor is inhibited with the motor drive control operation being disabled when abnormal situation such as overrun of the main processor or the like disturbance thereof and/peripheral devices thereof continue for a predetermined period which exceeds a failsafe period of the power steering system, whereby adverse influence of abnormality or disturbance of the main processor and others to the operation of the power steering system can be suppressed in a satisfactory manner.

Moreover, according to a third aspect of the invention, there is provided a control apparatus for a motor-driven power steering system of a motor vehicle, which includes an electric motor connected to a main power supply source for generating an assist torque for assisting a driver in manipulating a steering wheel of the motor vehicle. The apparatus comprises a main processor and a subsidiary processor for arithmetically determining driving control information for the electric motor for thereby controlling the assist torque generated by the electric motor on the basis of driving information of the motor vehicle supplied externally. The main and subsidiary processors cooperate to mutually diagnose occurrence of abnormality on the basis of results of arithmetic determination. A motor driving circuit is provided for outputting motor driving signals for driving the electric motor on the basis of the driving control information available from the main processor means and the subsidiary processor means, wherein each of the main and subsidiary processors includes a signal send/receive module for allowing a signal indicative of the result of the abnormality diagnosis to be transferred between the main processor and the subsidiary processor. Further, a signal interrupt circuit is provided for interrupting supply of the driving control information to the motor driving means from the main processor or alternatively from the subsidiary processor when the diagnostic result indication signal as received from the processor indicates occurrence of abnormality in at least one of the main processor and the subsidiary processor.

In a predetermined mode for realizing the third aspect of the invention, the driving control information may include motor driving current control information for controlling an electric current supplied to the motor, motor driving direction information indicating a direction in which the motor is to be rotated and motor power supply control information for controlling power supply to the motor. In that case, the signal interrupt module may be comprised of a first logical product circuit for determining a logical product between the motor driving current control information outputted from the main processor and motor driving direction information generated by the subsidiary processor on the basis of the motor driving direction information received from the main processor, and a second logical product circuit for determining a logical product between the aforementioned motor power supply control information and motor power supply control information which is generated by the subsidiary processor on the basis of the motor power supply control signal transferred from the main processor.

The main processor may include a first arithmetic module for arithmetically determining the motor driving current control information and the motor driving direction information on the basis of a steering torque signal fetched from the output of a torque sensor and a vehicle speed sensor signal fetched from the output of a vehicle speed sensor, a signal transfer module for sending at least the motor driving direction information to the second processor, and a first memory for storing the motor driving direction information and the motor driving current information, while the second processor means may include a second arithmetic module for arithmetically determining second motor driving direction information on the basis of the steering torque signal, a comparison module for comparing the motor driving direction information determined by the second arithmetic module with the motor driving direction information received from the main processor, a second diagnosis module for deciding whether abnormality occurs in the main processor and devices connected thereto on the basis of result of the comparison to thereby generate the diagnostic result indication signal indicating occurrence of abnormality when the decision results in affirmation. The signal interrupt module of the subsidiary processor is activated in response to the diagnostic result signal indicating occurrence of abnormality. The diagnostic result signal is transferred to the first processor through the signal send/receive module.

The main processor may further include a first diagnosis module which responds to the diagnostic result signal received from the second processor to thereby decide whether abnormality takes place in the main processor and/or the devices associated therewith on the basis of the motor driving current control information and the motor driving direction information stored in the memory as well as corresponding information arithmetically determined on the basis of steering torque signal and vehicle speed signal fetched from outputs of the steering torque sensor and the vehicle speed sensor, respectively, in succession to the reception of the diagnostic result signal, and a first inhibit module for inhibiting operation of the motor driving means when occurrence of abnormality is decided by the first diagnosis module.

In another preferred mode, the main processor may further include a decision module for deciding that abnormality takes place in the subsidiary processor and/or devices associated therewith when result of the decision performed by the first diagnosis module shows that no abnormality is taking place in the main processor means and/or devices provided in association with the main processor means, and a means for inhibiting the driving control information from being transferred to the subsidiary processor.

As will be appreciated from the foregoing description, by virtue of the arrangements according to the third aspect of the invention, not only the main processor stops the steering torque generation control upon detection of some fault or abnormality as the result of the abnormality detection but also the subsidiary processor executes the processing for stopping the steering torque generation control. In this manner, the reliability of the steering assist torque generation by the electric motor can remarkably be enhanced particularly owing to the arrangement that redundancy is provided by the subsidiary CPU to complement the steering torque generation control performed by the main processor even when the torque generation stop processing of the main processor is insufficient or incomplete because of abnormality taking place in the main CPU.

The above other objects, features and attendant advantages of the present invention will more clearly be understood by reading the following description of the preferred embodiments thereof taken, only by way of example, by reference to the drawings.

BRIEF DESCRIPTION OF THE DRAWINGS

FIG. 8 is a flow chart for illustrating operation of a subsidiary processor or CPU of the control apparatus shown in FIG. 5;

FIGS. 9A, 9B and 9C are views for graphically illustrating relation between operation of a steering wheel and an output signal of a torque sensor employed in the control apparatus shown in FIGS. 1 and 5;

FIGS. 10A, 10B and 10C are views for graphically illustrating operation of a motor control arithmetic module shown in FIGS. 2 and 7 for determining an assist torque to be generated by a driving motor of the power steering control system in dependence on the output signals of a torque sensor and a vehicle speed sensor;

FIG. 13 is a flow chart for illustrating processing operation performed by a subsidiary processor (CPU) shown in FIG. 11.

DESCRIPTION OF THE PREFERRED EMBODIMENTS

Now, the present invention will be described in detail in conjunction with preferred or exemplary embodiments thereof by reference to the drawings.

Embodiment 1

Figure 1:
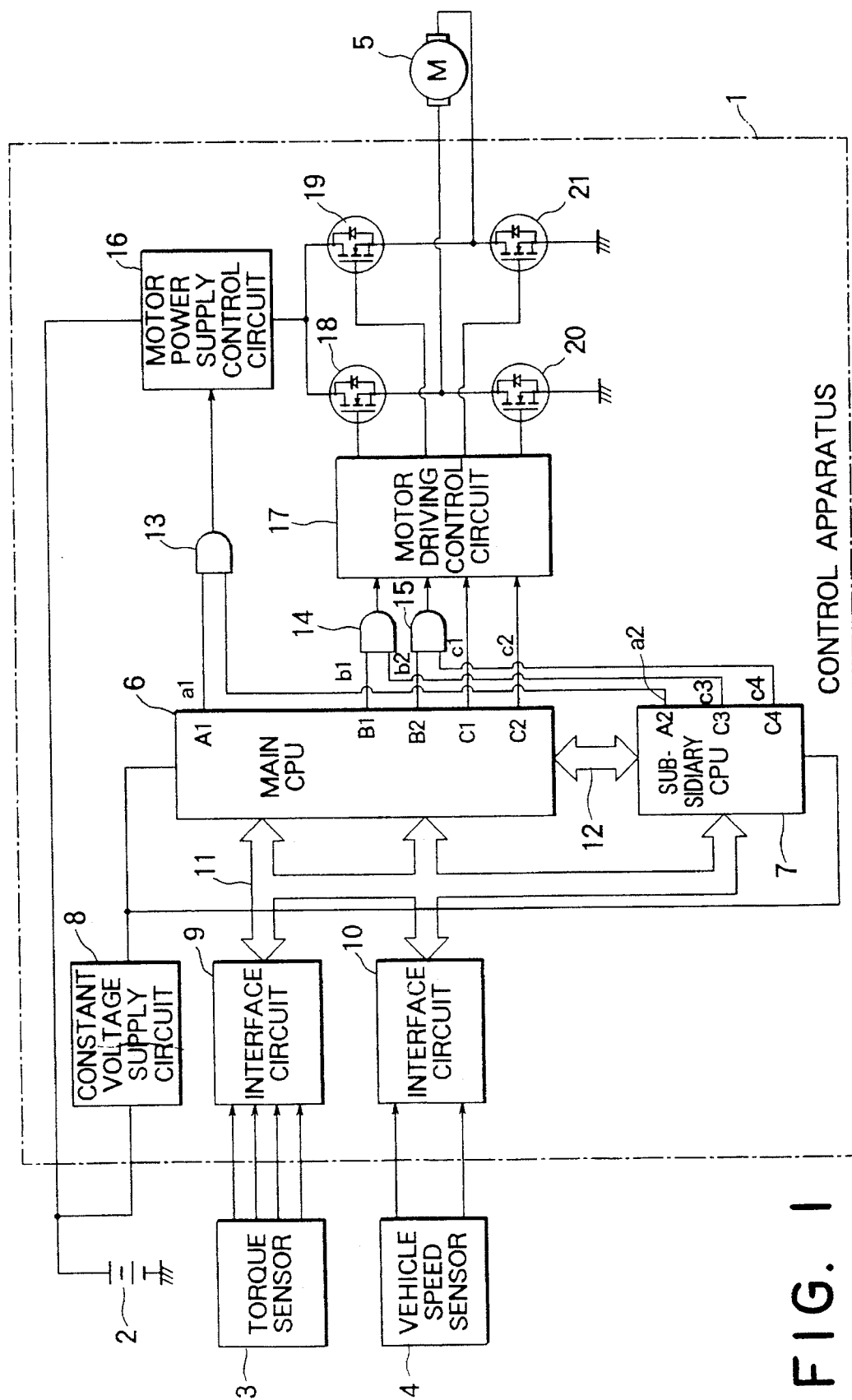
FIG. 1 is a diagram showing generally a circuit configuration of a motor-driven power steering system incorporating a control apparatus according to a first embodiment of the invention.

FIG. 1 is a diagram showing a circuit configuration of a motor-driven power steering system according to a first embodiment of the invention.

Referring to FIG. 1, a control apparatus 1 for controlling an electric motor 5 which is adapted to generate an assist torque for assisting the driver in manipulating a steering wheel of a motor vehicle is provided with a torque sensor 3 for detecting a steering torque applied by the driver to a steering system (not shown) and a vehicle speed sensor 4 for detecting the speed of the motor vehicle. The torque sensor 3 and the vehicle speed sensor 4 cooperate to constitute input signal means of the control apparatus according to the invention. The control apparatus 1 controls power supply to the electric motor 5 from an onboard battery 2 in dependence on the output signals of the sensors 3 and 4, as described hereinafter.

The control apparatus 1 includes a main central processing unit or CPU 6 serving as a first processor or arithmetic means of the control apparatus according to the invention, a subsidiary CPU 7 which has a lower processing capability or performance when compared with that of the main CPU 6 and which serves as a second processor means of the control apparatus of the invention, a constant voltage power supply circuit 8 connected to the battery 2 via a fuse or the like safety device for supplying a predetermined constant voltage to the main CPU 6 and the subsidiary CPU 7 and other components of the control apparatus 1, and interface circuits 9 and 10 for conditioning the output signals of the torque sensor 3 and the vehicle speed sensor 4 to be supplied to the main CPU 6 and the subsidiary CPU 7 via a first data bus 11.

In the control apparatus 1, the main CPU 6 and the subsidiary CPU 7 are interconnected through a second data bus 12 through which driving direction signals c1 and c2 indicating clockwise (forward) and counterclockwise (backward) directions, respectively, for the electric motor 5 and a power supply enable signal a1 commanding operation of a motor power supply control circuit 16, as described hereinafter, are transferred from the main CPU 6 to the subsidiary CPU 7.

The main CPU 6 has output terminals A1, B1, B2, C1 and C2 while the subsidiary CPU 7 has output terminals A2, C3 and C4. A first AND circuit 13 has one input terminal connected to the terminal A1 of the main CPU 6 and applied with the power supply enable signal a1 for controlling the motor power supply control circuit 16, while the other input terminal of the first AND circuit 13 is connected to the terminal A2 of the subsidiary CPU 7 to be supplied with a second power supply enable signal a2 which results from the processing of the first power supply signal a1 by the subsidiary CPU 7. A second AND circuit 14 has an input connected to the output terminal B1 of the main CPU 6 to be supplied with a PWM (Pulse Width Modulation) signal b1 for controlling operation of the electric motor 5 in one direction (e.g. clockwise or forward direction) and the other input which is connected to the output terminal C3 of the subsidiary CPU 7 to be supplied with a driving direction signal c3 indicating of the forward rotation of the electric motor 5 as well. Finally, a third AND circuit 15 has an input connected to an output terminal B2 of the main CPU 6 and supplied with a second PWM signal b2 for controlling the operation of the electric motor 5 in the other direction (e.g. counterclockwise or backward direction) and the other input connected to the terminal c4 of the subsidiary CPU 7 to be supplied with a driving direction signal c4 indicative of the backward rotation of the electric motor 5.

The motor power supply control circuit 16 may be constituted by a relay or the like element for supplying an electric power to the driving motor 5 through H-like bridge circuits described hereinafter in response to the output of the AND circuit 13. On the other hand, the motor drive control circuit 17 has inputs connected, respectively, to the output terminals of the second AND circuits 14 and 15 and the output terminals C1 and C2 of the main CPU 6 for generating motor driving signals on the basis of the output signals of the second and third AND circuits 14 and 15 as well as the driving direction signals c1 and c2 outputted from the main CPU 6.

The output terminal of the motor power supply control circuit 16 is connected to drain electrodes of FETs (Field Effect Transistor) 18 and 19 which are connected in a H-like bridge circuit configuration, wherein the source electrodes of these FETs 18 and 19 are connected to drain electrodes of FETs 20 and 21 which are similarly connected in a H-like bridge circuit, the sources of the latter being grounded. The FETs 18, 19, 20 and 21 have gate electrodes connected to the output terminals of the motor drive control circuit 17, respectively, wherein a junction between the source electrode of the FET 18 and the drain electrode of the FET 20 is connected to one terminal of the driving motor 5, while a junction between the source of the FET 19 and the drain of the FET 21 is connected to the other terminal of the electric motor 5. Parenthetically, the motor drive control circuit 17 and the FETs 18, 19, 20 and 21 cooperate to constitute the driving means which constitutes a part of the control apparatus according to the invention.

Next, description will be directed to operation of the motor-driven power steering system implemented in the structure described above.

The constant voltage power supply circuit 8 fed with electric energy from the battery 2 generates a constant voltage which is supplied to the main CPU 6 and the subsidiary CPU 7, respectively. The output signal of the torque sensor 3 is fetched by the interface circuit 9 to be converted into a steering torque signal indicative of a steering torque applied to the steering wheel by the driver. The steering torque signal thus generated is supplied to both the main CPU 6 and the subsidiary CPU 7 via the first data bus 11.

Similarly, the output signal of the vehicle speed sensor 4 is fetched by the interface circuit 10 to be converted into a signal indicative of the speed of the motor vehicle (i.e., vehicle speed signal) which is then supplied to both the main CPU 6 and the subsidiary CPU 7 via the first data bus 11.

Figure 3:
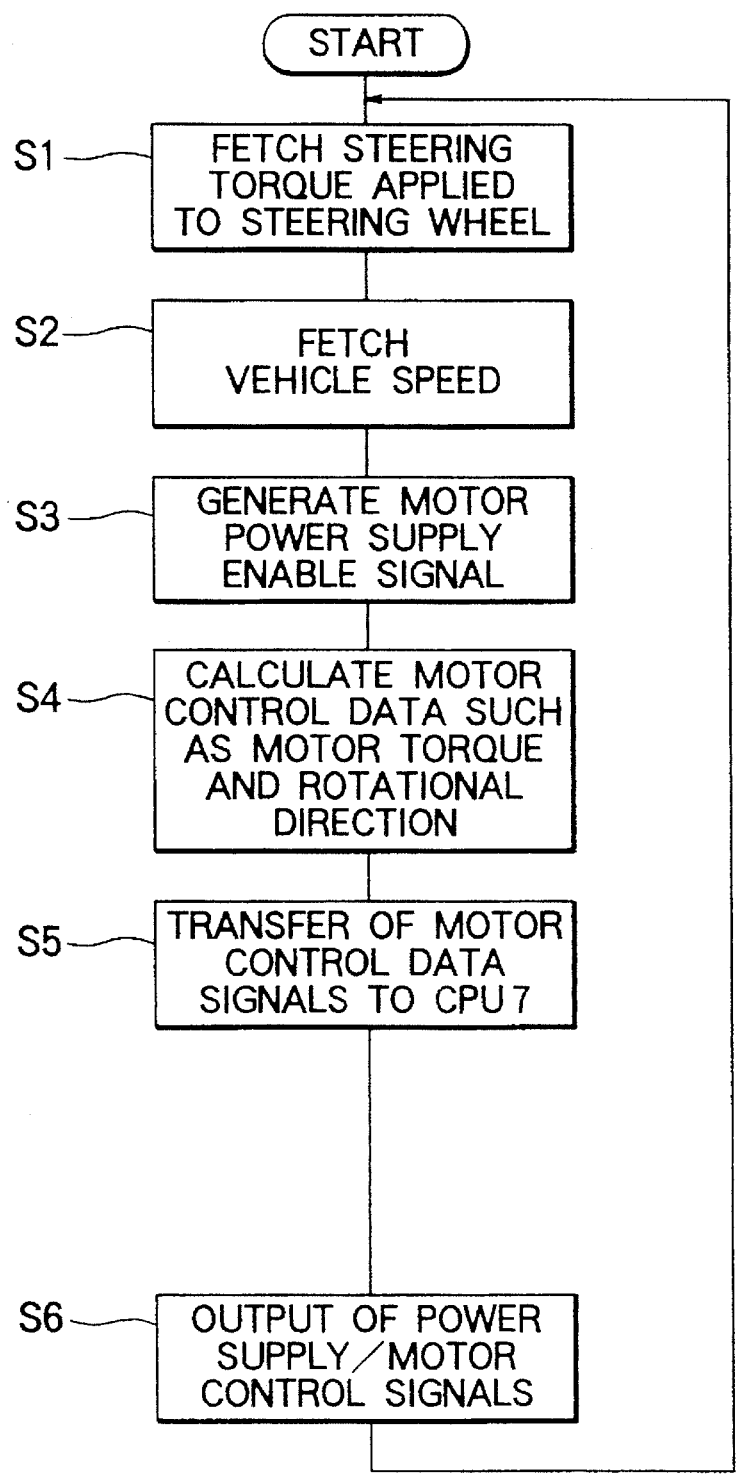
FIG. 3 is a flow chart for illustrating processing executed by the main processor.

The main CPU 6 processes the input signals supplied from the interface circuits 9 and 10 in accordance with a program such as illustrated in FIG. 3 and stored in an internal ROM (Read-Only Memory) of the main CPU 6 to thereby generate the first power supply enable signal a1 commanding on/off operation of the motor power supply control circuit 16 which is designed to turn on or off the power supply to the driving motor 5. The power supply enable signal a1 is then applied to one input of the first AND circuit 13 and at the same time transferred to the subsidiary CPU 7 via the second data bus 12.

Further, the main CPU 6 arithmetically determines or calculates the driving current and the driving direction for the electric motor 5 on the basis of the torque sensor signal and the vehicle speed sensor signal inputted via the interface circuits 9 and 10 to thereby generate the driving direction signals c1 and c2 indicative of the forward and the backward rotations, respectively, of the motor 5, as well as the PWM (Pulse-Width Modulation) signals b1 and b2 indicating magnitudes of the motor currents in the forward and backward rotations, respectively. The driving direction signals c1 and c2 are directly applied to the motor drive control circuit 17, while the PWM signals b1 and b2 are supplied to the AND circuits 14 and 15, respectively.

On the other hand, the subsidiary CPU 7 receives the driving direction signals c1 and c2 as well as the power supply enable signal a1 from the main CPU 6 via the second data bus 12 to thereby derive the driving direction signals c3 and c4 indicating the forward and backward rotations of the electric motor 5 as well as the power supply signal a2 for controlling the power supply to the electric motor 5 through the motor power supply control circuit 16, wherein the signals c3, c4 and a2 are applied to the AND circuits 14, 15 and 13, respectively. In this manner, the driving direction signals c1 and c2 supplied to the motor drive control circuit 17 and the power supply enable signal a1 for the motor power supply control circuit 16 are processed by the subsidiary CPU 7, whereby the signals c3, c4 and a2 mentioned above are generated.

At this junction, it should be recalled that the subsidiary CPU 7 has a lower processing capability or poor performance as compared with that of the main CPU 6. Thus, although the main CPU 6 bears burden of processing the torque sensor signal and the vehicle speed signal supplied from the interface circuits 9 and 10 to thereby control the driving direction of the electric motor 5 as well as the power supply thereto, the subsidiary CPU 7 simply serves to compare the driving direction signal c1 or c2 transferred from the main CPU 6 via the second data bus 12 with the corresponding sensor signal supplied from the input interface 10 while outputting the signal a1 transferred from the main CPU 6 straightforwardly as the signal a2. In other words, the subsidiary CPU 7 is used for making decision as to possibility of occurrence of abnormality or disturbance in the peripheral devices such as the torque sensor 3, the vehicle speed sensor 4, the interface circuits 9 and 10 and the main CPU 6. When abnormality or disturbance is detected as the result of the comparison mentioned above and when the abnormal state continues for a predetermined duration, e.g. 0.1 second or longer, occurrence of abnormality or disturbance is decided, whereupon the subsidiary CPU 7 changes over the logical level of the power supply enable signal a2 and the driving direction signal c3 or c4 so that the AND circuits 13 and 14 (or 15) are disenabled to output the respective signals. More specifically, the power supply enable signals a1 and a2 outputted from the main CPU 6 and the subsidiary CPU 7, respectively, are logically ANDed by the first AND circuit 13, the logical product signal outputted therefrom being supplied to the motor power supply control circuit 16. On the other hand, the PWM signal b1 and the driving direction signal c3 outputted from the main CPU 6 and the subsidiary CPU 7, respectively, are logically ANDed by the second AND circuit 14, the output of which is supplied to the motor drive control circuit 17. Further, the PWM signal b2 and the driving direction signal c4 are logically ANDed by the AND circuit 15, the output of which is supplied to the motor drive control circuit 17.

The motor drive control circuit 17 supplies the driving signal to the gate electrodes of the FETs 18; 21 or 19; 20, respectively, on the basis of the outputs of the AND circuit 14 or 15 as well as the driving direction signal or c2 supplied from the main CPU 6 to thereby control the motor current of the driving motor 5 and the rotational direction thereof.

Next, by referring to FIGS. 2 to 4, description will be made of the functional configurations and operations of the main CPU 6 and the subsidiary CPU 7 of the power steering control apparatus shown in FIG. 1.

Figure 2:
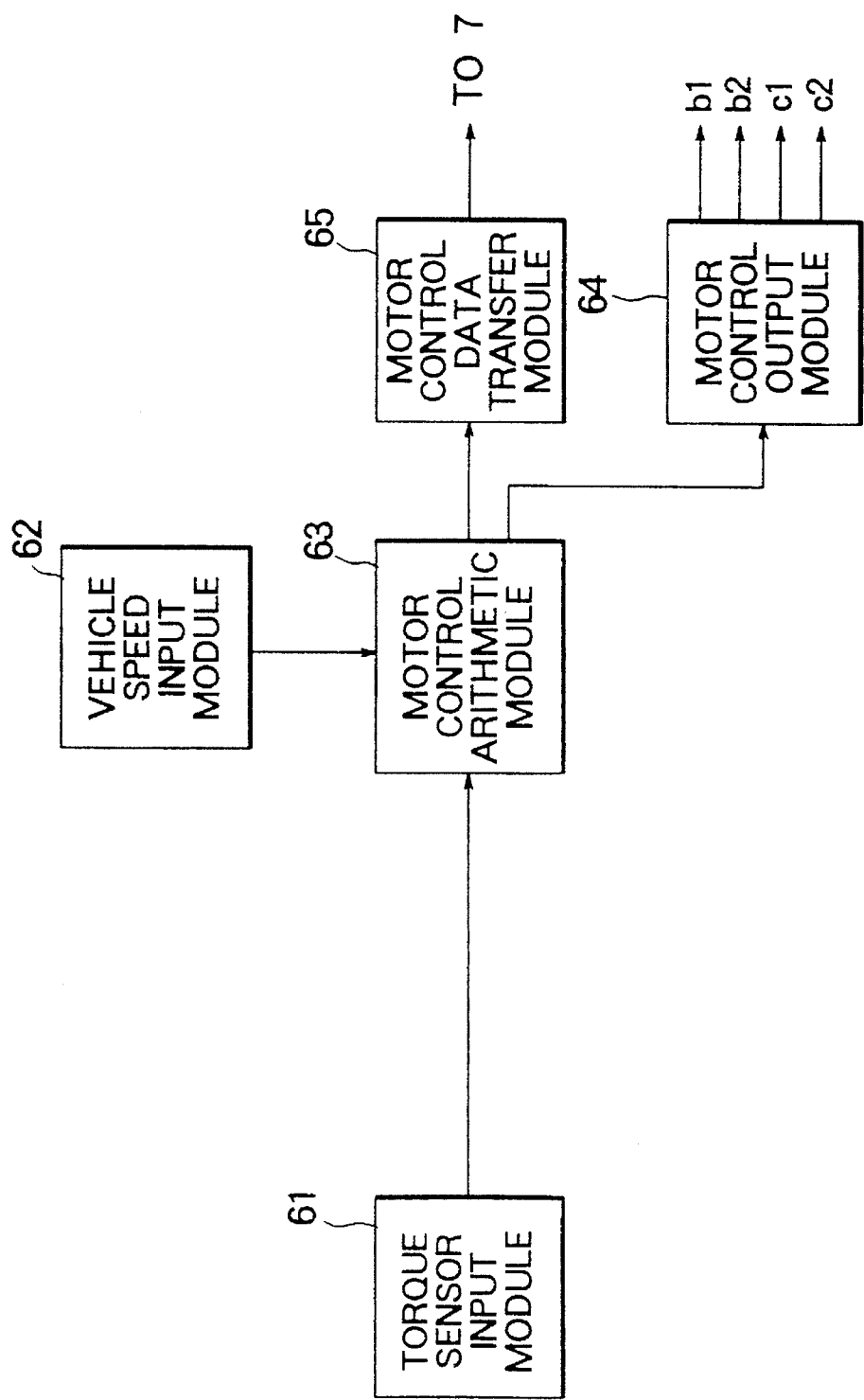
FIG. 2 is a functional block diagram of a main processor or CPU of the control apparatus shown in FIG. 1.

FIG. 2 is a functional block diagram of the main CPU 6. Referring to the figure, the main CPU 6 is comprised of a torque sensor input module 61 for fetching the signal indicating the steering torque being applied to the steering wheel by the driver, a vehicle speed input module 62 for fetching the vehicle speed signal detected by the vehicle speed sensor 3, a motor control arithmetic module 63 for determining the driving direction and the driving current for the motor 5 on the basis of the steering torque signal and the vehicle speed signal as fetched, a motor control output module 64 serving for controlling the motor current (i.e., motor torque) and the rotational direction of the motor and a motor control data transfer module 65 for delivering the motor driving direction signal and others to the subsidiary CPU 7 on the basis of the output of the motor control arithmetic module 63.

On the other hand, the subsidiary CPU 7 is comprised of a torque input module for fetching the signal indicative of the steering torque, a vehicle speed input module for fetching the vehicle speed of the motor vehicle, a motor driving direction arithmetic module for determining the driving direction for the driving motor 5 on the basis of the steering torque and vehicle speed information, a motor control data receiving module for receiving the motor control data transferred from the main CPU 6, a motor driving direction comparator module for comparing the motor driving direction data transferred from the main CPU 6 with the rotational direction of the motor 5 determined by the above-mentioned arithmetic module, a motor power supply control module for issuing a control signal for enabling or inhibiting the power supply to the driving motor 5 in dependence on the result of the comparison mentioned above, i.e., whether the comparison results in coincidence or alternatively in discrepancy which continues for a predetermined period, a motor drive enable signal module for generating a motor drive enable signal on the basis of the motor driving data transferred from the main CPU 6, an abnormality or disturbance decision module for determining a period during which the result of comparison performed by the above-mentioned comparison module continues to indicate the discrepancy, a motor power supply inhibit module for generating a signal inhibiting the power supply to the driving motor 5 when the abnormality or disturbance mentioned above is decided, and a motor operation inhibiting module for generating a signal inhibiting the driving of the driving motor 5, although the above-mentioned component modules of the subsidiary CPU 7 are omitted from illustration in the drawings.

Figure 4:
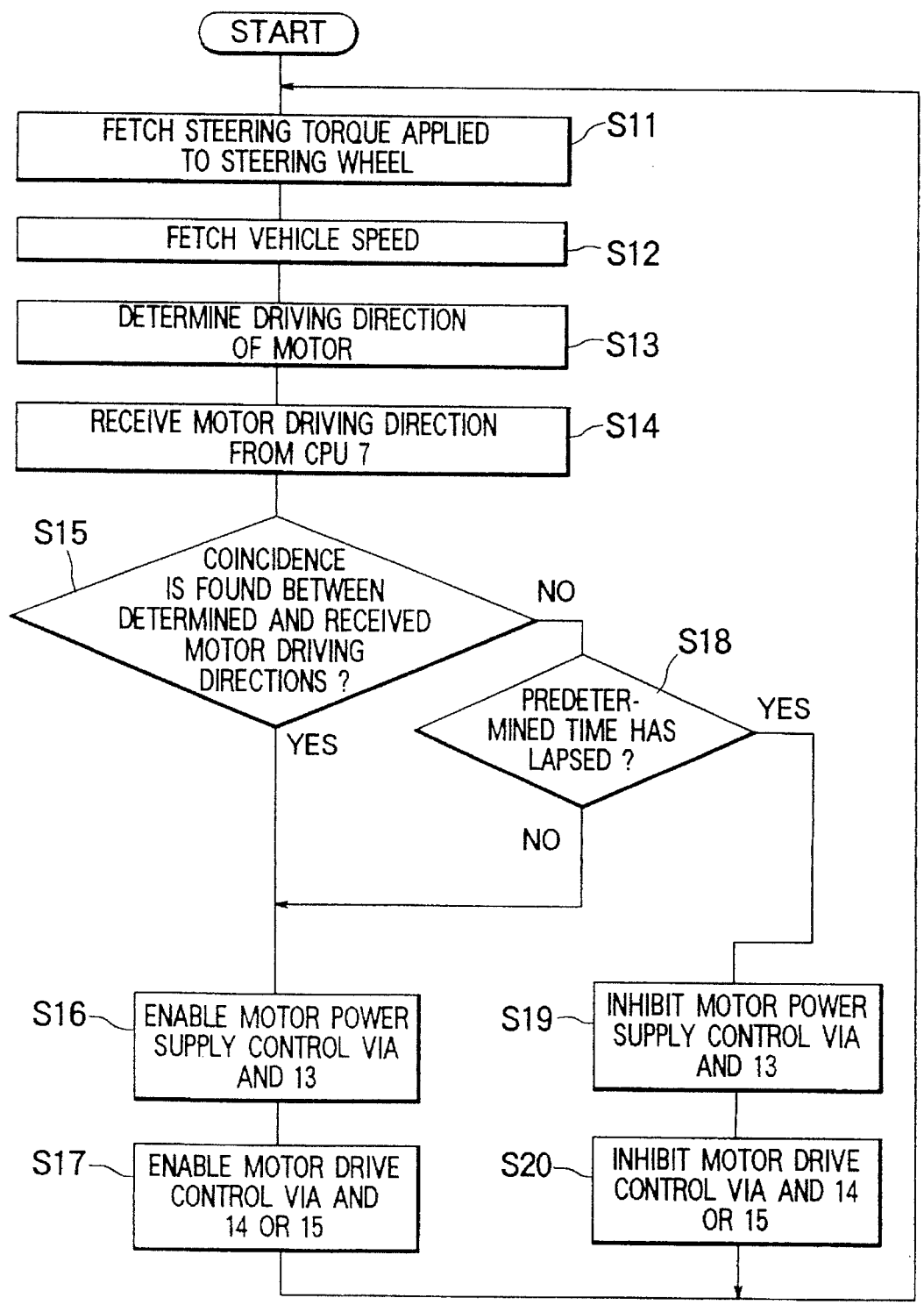
FIG. 4 is a flow chart for illustrating processing executed by a subsidiary processor (CPU) incorporated in the control apparatus shown in FIG. 1.

Next, description will turn to operation of the power steering control apparatus by referring to FIGS. 3 and 4.

At first, the main CPU 6 fetches a torque sensor signal from the torque sensor 3 in a step S1 and then fetches a vehicle speed signal from the vehicle speed sensor 4 in a step S2 to thereby calculate on the basis of these signals the electric power to be supplied to the driving motor 5 in a step S3. The torque sensor signal and the vehicle speed signal as fetched are supplied to the motor torque arithmetic module 63 shown in FIG. 2.

In a step S4, the motor control arithmetic module 63 arithmetically determines the PWM signal b1 or b2 indicative of the target driving power P as well as the driving direction signal c1 or c2 on the basis of the torque sensor signal, the vehicle speed signal and other steering information signals such as a signal indicating an angular position of the steering wheel, an angular speed signal of the steering wheel and the like in such a manner as described hereinafter in conjunction with a second embodiment of the invention by reference to FIGS. 9 and 10, wherein the PWM signal b1 or b2 and the driving direction signal c1 or c2 are supplied to the motor control output module 64. At the same time, the driving direction signal c1 or c2 is also supplied to the motor control data transfer module 65 (steps S5 and S6).

In this conjunction, it is assumed, by way of example, that the driving direction signals c1 and c3 are set to a high level "1" when the driving motor 5 is to be rotated in the forward direction corresponding to the clockwise rotation of the steering wheel whereas when the driving motor 5 is to be driven in the backward direction, the driving direction signal c2 and c4 are set to high level "1", respectively.

On the other hand, the subsidiary CPU 7 fetches the torque sensor signal from the torque sensor 3 while fetching the vehicle speed signal from the vehicle speed sensor 4 (steps S11 and S12).

Since the motor drive control arithmetic module of the subsidiary CPU 7 is poor in respect to the processing capability when compared with that of the main CPU 6, the former is so programmed as to determine only the driving direction of the driving motor 5 from the steering torque, the vehicle speed and the like information in a step without performing arithmetic operation for calculating the motor output torque which requires rather complicated processing, as described hereinbefore by reference to FIG. 2.

On the other hand, the motor output torque data receiver module of the subsidiary CPU 7 receives via the second data bus 12 the signal corresponding to the driving direction signal c1 or c2 from the main CPU 6 upon every arithmetic cycle (e.g. every 1 ms) of the main CPU 6 (step S14).

In the motor driving direction comparison module of the CPU 7, the driving or rotational direction of the driving motor 5 indicated by the motor drive control data transferred from the arithmetic module 63 of the main CPU 6 is compared with the driving direction of the driving motor 5 as determined by the subsidiary CPU 7 itself (step S15). When the result of this comparison shows coincidence, a coincidence signal is supplied to the motor control output module. On the other hand, when the above-mentioned comparison results in discrepancy, decision is made by the abnormality/duration decision module of the subsidiary CPU 7 as to whether a predetermined time (e.g. 0.1 sec) has lapsed (step S18). When this decision results in negation (NO), it is decided that no abnormality takes place, whereby a corresponding signal is sent to the motor control output module of the subsidiary CPU 7.

The motor control output module then supplies the power supply signal a2 to the first AND circuit 13 (step S16), while supplying the motor driving direction signal c3 or c4 to the second AND circuit 14 or the third AND circuit 15 as the motor drive control enable signal (step S17 in FIG. 4).

On the contrary, when the decision in the above-mentioned step S18 indicates occurrence of abnormality, the motor driving power supply stop module of the subsidiary CPU 7 issues a motor power supply inhibit signal for inhibiting the power supply to the driving motor 5 by resetting the power supply enable signal a2 (step S19), while the motor control output inhibit module of the CPU 7 inhibits the supply of the driving direction signal c3 or c4 to the AND circuit 14 or 15 by resetting the same.

As can now be understood from the foregoing description, according to the teachings of the invention, the supply of the drive enable signal to the motor power supply control circuit 16 as well as the power supply thereto is interrupted when discrepancy is detected as the result of comparison between the driving direction of the driving motor 5 determined by the main CPU 6 and that determined by the subsidiary CPU 7 on the basis of the output of the torque sensor 3 and when the predetermined time has lapsed from the detection of the discrepancy. Thus, the reliability of operation of the power steering control apparatus can significantly be enhanced with a simplified and inexpensive circuit configuration. Further, the subsidiary CPU 7 which may have a lower processing capability than that of the main CPU 6 may be constituted by a commercially available inexpensive CPU. In this manner, high security can be ensured for the motor-driven steering control apparatus by virtue of such arrangement that the electric power supply to the driving motor 5 is inhibited with the motor drive control operation being disabled when abnormal situation such as overrun of the main CPU 6 or the like disturbance thereof and/or various sensors and other components continue for a predetermined period which exceeds a failsafe period of the power steering system, whereby adverse influence of abnormality or disturbance of the main CPU 6 and other components to the motor-driven power steering system can positively be suppressed to a possible minimum.

Embodiment 2

Figure 5:
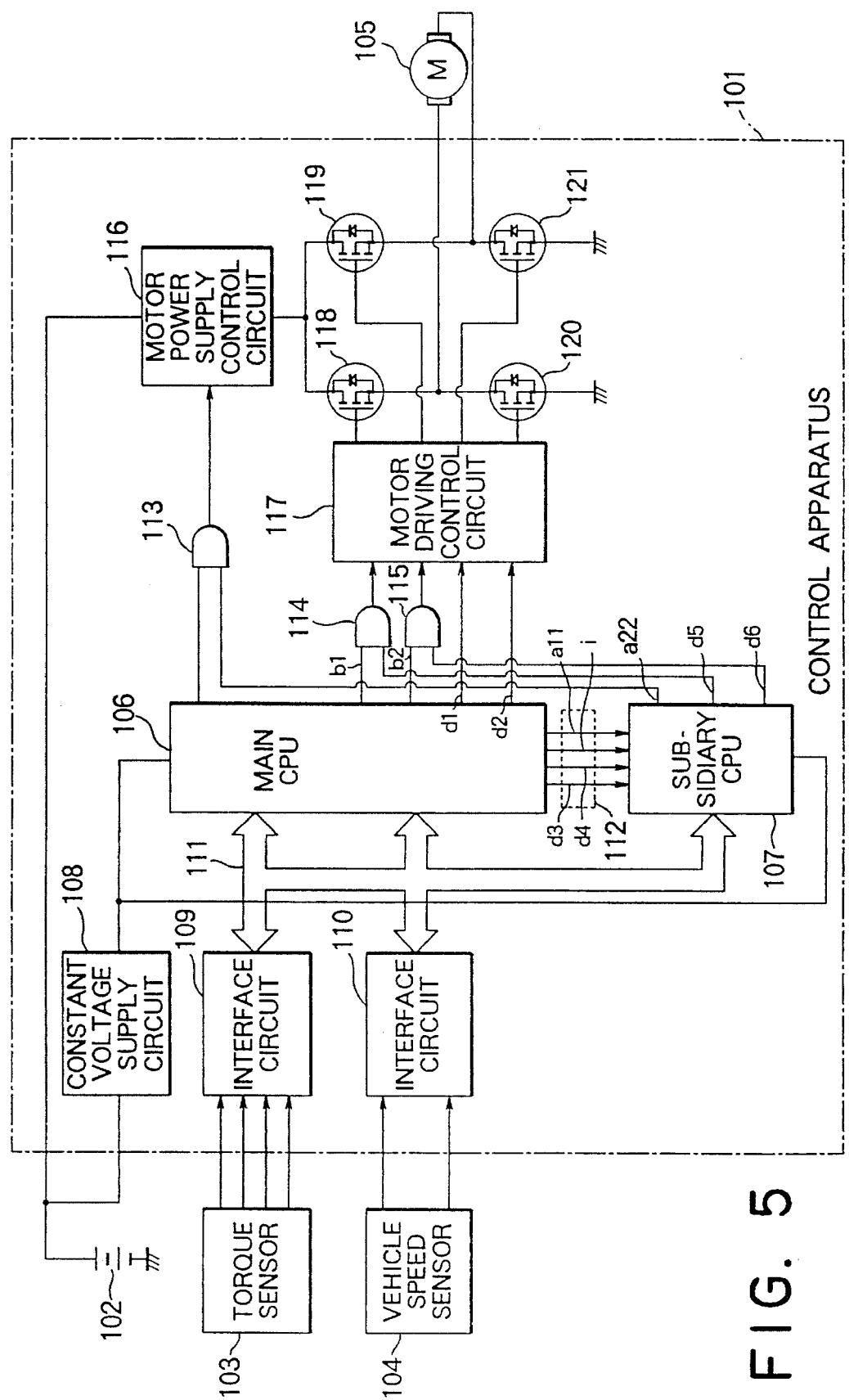
FIG. 5 shows a configuration of a motor-driven power steering system incorporating a control apparatus according to a second embodiment of the invention.

In the case of the first embodiment of the power steering control apparatus, there may arise such situation in which the power steering control is interrupted even when the steering wheel is reversely rotated only transiently, as is experienced when a driver rotates the steering wheel. clockwise in order to turn the motor vehicle to the right and subsequently rotates counterclockwise the steering wheel only transiently for some reason. With a second embodiment of the invention, it is contemplated to ensure a smooth or comfortable steering even in the situation such as mentioned above. FIG. 5 shows a configuration of a motor-driven power steering system including a control apparatus according to the second embodiment of the invention.

Referring to FIG. 5, a control apparatus which is generally denoted by 101 and serves to control an electric motor 105 for generating a steering assist torque is provided with a torque sensor 108 for detecting a steering torque applied by the driver to a steering wheel (not shown) and a vehicle speed sensor 104 for detecting the speed of the motor vehicle. The control apparatus 101 controls the assist torque generation by the electric motor 105 on the basis of the output signals of the sensors 108 and 104.

As in the case of the first embodiment of the invention, the control apparatus 101 includes a main CPU (Central Processing Unit or processor) 106, a subsidiary CPU 107 which has a lower processing capability or performance when compared with that of the main CPU 106, a constant voltage power supply circuit 108 connected to a main power supply source or battery 102 via a safety device such as fuse (not shown) for supplying a predetermined constant voltage to the main CPU 106 and the subsidiary CPU 107 and other components of the control apparatus 101, and interface circuits 109 and 110 for fetching the output signals of the torque sensor 103 and the vehicle speed sensor 104, respectively, the signals being supplied to the main CPU 106 and the subsidiary CPU 107 via a first data bus 111.

In the control apparatus 101, the main CPU 106 and the subsidiary CPU 107 are interconnected through a second data bus 112 through which driving direction signals d3 and d4 indicating forward (clockwise) and backward (counter-clockwise) directions, respectively, of the driving motor 105, a direction coincidence/discrepancy signal i indicating coincidence or discrepancy between the direction of the steering torque detected by the torque sensor 103 and the driving direction for the motor 105 determined in a manner described in detail hereinafter, and a power supply enable signal a11 commanding operation of a motor power supply control circuit 116 (also described hereinafter) are transferred from the main CPU 106 to the subsidiary CPU 107.

At the output sides of the main CPU 106 and the subsidiary CPU 107, there is provided a first AND circuit 113 having one input terminal connected to an output of the main CPU 106 to be applied with the power supply enable signal a11 generated by the main CPU 106 itself for turning on or off the motor power supply control circuit 116 which may be constituted by a switch circuit, while the other input terminal of the first AND circuit 113 is connected to an output of the subsidiary CPU 107 to be supplied with a second power supply enable signal a22 which results from the processing of the power supply signal a11 by the subsidiary CPU 107. A second AND circuit 114 has an input connected to an output terminal of the main CPU 106 to be applied with a PWM (Pulse Width Modulation) control signal b1 for controlling operation of the electric motor 105 (i.e., generation of assist torque by the motor 105) in one direction (which is assumed to be, by way of example only, the forward or clockwise direction) and the other input which is connected to another output of the subsidiary CPU 107 to be supplied with a driving direction signal d5 indicative of the forward rotation of the electric motor 105 (corresponding to the clockwise rotation of the steering wheel). Further, a third AND circuit 115 is provided which has an input connected to an output of the main CPU 106 to be supplied with a second PWM control signal b2 for controlling generation of assist torque by the electric motor 105 in the other direction (backward or counterclockwise direction from the above assumption) and the other input connected to yet another output of the subsidiary CPU 107 to be applied with a driving direction signal d6 indicative of the backward rotation of the electric motor 105 (corresponding to the counterclockwise rotation of the steering wheel).

The motor power supply control circuit 116 may be constituted by a relay or the like switching circuit for supplying an electric power from the battery 102 to the driving motor 105 through H-like bridge circuits (described hereinafter) in response to the output of the AND circuit 113. On the other hand, the motor drive control circuit 117 has inputs supplied, respectively, with the outputs of the AND circuits 114 and 115 and the driving direction signals d1 and d2 from the main CPU 106 for driving the motor 105 on the basis of these signals.

The output terminal of the motor power supply control circuit 116 is connected to drain electrodes of FETs (Field Effect Transistor) 118 and 119 which are connected in a H-like bridge circuit configuration, wherein the source electrodes of these FETs 118 and 119 are connected to drain electrodes of FETs 120 and 121 which have the respective source electrodes connected to the ground potential. The FETs 118, 119, 120 and 121 have gate electrodes connected to output terminals of the motor drive control circuit 117, respectively, wherein a junction between the source electrode of the FET 118 and the drain electrode of the FET 120 is connected to one terminal of the electric motor 105, while a junction between the source of the FET 119 and the drain of the FET 121 is connected to the other terminal of the motor 105.

Next, operation of the motor-driven power steering control apparatus according to the second embodiment of the invention will be described.

The constant voltage power supply circuit 108 fed with electric energy from the battery 102 generates a constant source voltage which is applied to the main CPU 106 and the subsidiary CPU 107, respectively. The output signal of the torque sensor 103 is fetched by the interface circuit 109 to be converted into a steering torque signal indicative of a steering torque applied to the steering wheel by the driver. The steering torque signal thus generated is supplied to both the main CPU 106 and the subsidiary CPU 107 via the first data bus 111.

Similarly, the output signal of the vehicle speed sensor 104 is fetched by the interface circuit 110 to be converted into a signal indicative of the speed of the motor vehicle (i.e., vehicle speed signal) which is then supplied to both the main CPU 106 and the subsidiary CPU 107 via the first data bus 111.

Figure 7:
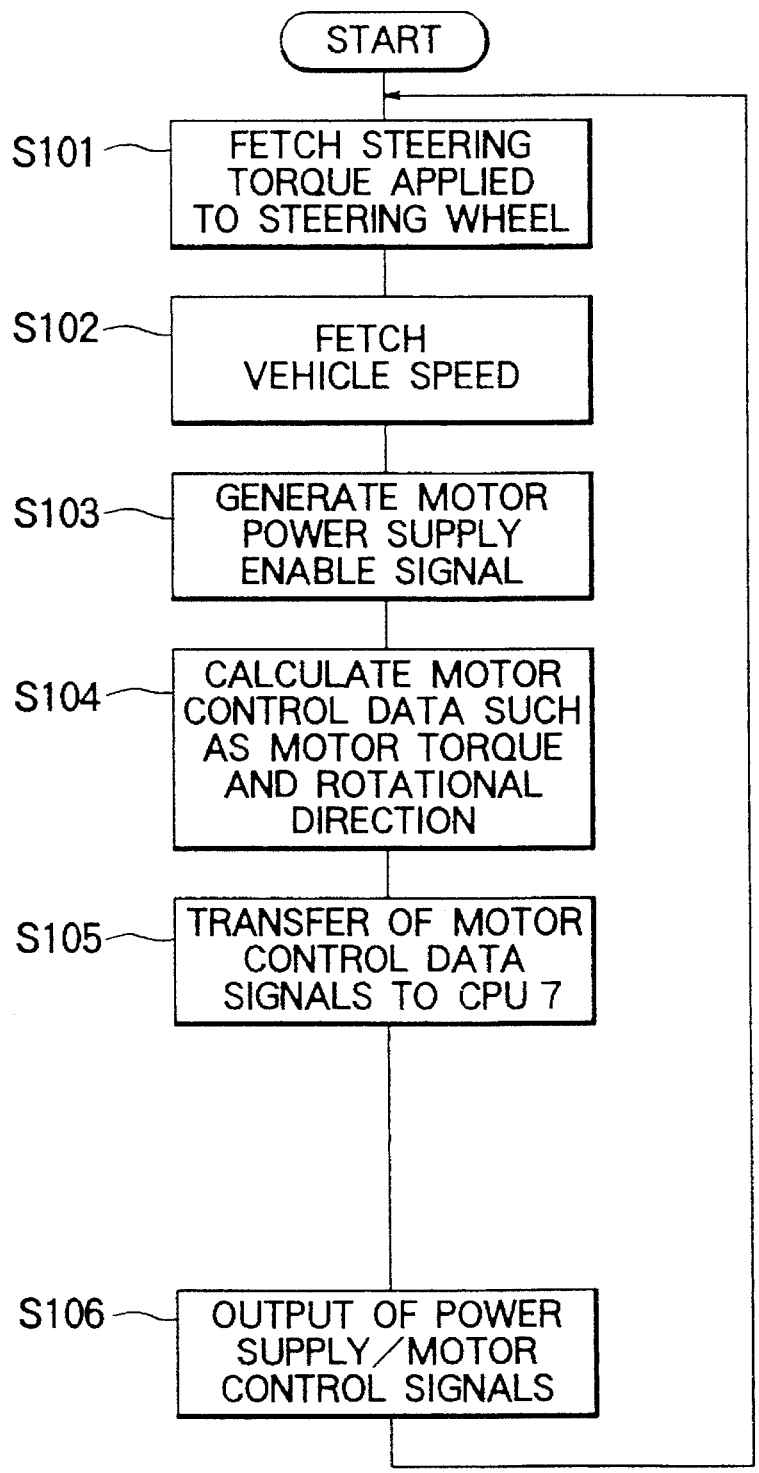
FIG. 7 is a flow chart for illustrating operation of the main CPU of the control apparatus shown in FIG. 5.

The main CPU 106 processes the steering torque signal and the vehicle speed signal thus inputted from the interface circuits 109 and 110 in accordance with a program which will be described later on by reference to FIG. 7 and which is stored previously in an internal ROM (Read-Only Memory) of the main CPU 106, to thereby generate the first power supply enable signal a11 commanding on/off operation of the motor power supply control circuit 116 which is designed to turn on or off the power supply to the driving motor 105. The power supply enable signal a11 outputted from the main CPU 106 is applied to one input of the first AND circuit 113 and concurrently sent to the subsidiary CPU 107 via the second data bus 112.

Further, the main CPU 106 arithmetically determines or calculates the driving current and the driving direction for the motor 105 on the basis of the torque sensor signal and the vehicle speed sensor signal inputted via the interface circuits 109 and 110 to thereby generate the driving direction signal d1 or d2 indicative of the forward (clockwise) or backward (counterclockwise) rotation of the motor 105 as well as the PWM (Pulse Width Modulation) control signal b1 or b2 indicating magnitude of the motor current (and hence magnitude of steering assist torque to be generated by the motor 105) in the forward or backward rotation. The driving direction signal d1 or d2 is directly applied to the motor drive control circuit 117, while the PWM control signal b1 or b2 is applied to the AND circuit 114 or 115, respectively. Further, transferred from the main CPU 106 to the subsidiary CPU 107 via the data bus 112 are the driving direction signal d3 or d4 as well as the direction coincidence/discrepancy signal i which indicates coincidence or discrepancy between direction of the steering torque detected by the torque sensor 103 and the motor driving direction signal d3 or d4, respectively.

On the other hand, the subsidiary CPU 107 receives the driving direction signal d3 or d4 as well as the power supply enable signal a11 from the main CPU 106 via the second data bus 112 to thereby generate the driving direction signal d5 or d6 indicating the forward or backward rotation of the electric motor 105 as well as the power supply signal a22 for controlling the power supply to the electric motor 105, wherein the signals d5 or d6 and a22 are applied to the inputs of the AND circuits 114 or 115 and 113, respectively. In this manner, the driving direction signal d1 or d2 supplied to the motor drive control circuit 117 and the power supply enable signal a11 for the motor power supply control circuit 116 are converted into the signals d5 or d6 and a22, respectively, by the subsidiary CPU 107.

As mentioned hereinbefore, the subsidiary CPU 107 has a lower processing capability or poor performance as compared with that of the main CPU 106. Thus, the subsidiary CPU 107 simply serves to compare the driving direction signal d3 or d4 transferred from the main CPU 106 via the second data bus 112 with the steering torque direction signal determined on the basis of the signals supplied from the input interfaces 109 and 110 to the subsidiary CPU 107, to thereby perform abnormality decision by taking into account the coincidence/discrepancy signal i as supplied from the main CPU 106. In other words, when abnormality or disturbance is detected as the result of the comparison mentioned above and when it is decided that the abnormal state continues for a predetermined duration, e.g. 0.1 second or longer, occurrence of abnormality is decided positively, whereupon the subsidiary CPU 107 changes over the logical level of the power supply enable signal a22 and the driving direction signal d5 or d6 so that the AND circuits 113 and 114 or 115 are inhibited from generating the respective output signals regardless of the signals a11 and b1 or b2 supplied directly from the main CPU 106. More specifically, the power supply enable signals a11 and a22 outputted from the main CPU 106 and the subsidiary CPU 107, respectively, are logically ANDed by the first AND circuit 113, the logical product signal outputted therefrom being supplied to the motor power supply control circuit 116. On the other hand, the PWM control signal b1 and the driving direction signal d5 outputted from the main CPU 106 and the subsidiary CPU 107, respectively, are logically ANDed by the AND circuit 114, the output of which is supplied to the motor drive control circuit 117. Further, the PWM control signal b2 and the driving direction signal d6 are logically ANDed by the AND circuit 115, the output of which is supplied to the motor drive control circuit 117.

The motor drive control circuit 117 supplies the driving signal to the gate electrodes of the FETs 118; 121 or 119; 120, respectively, on the basis of the outputs of the AND circuit 114 or 115 as well as the driving direction signal d1 or d2 supplied from the main CPU 106 to thereby apply a control signal to the gates of the FETs 118 and 121 or the FETs 119 and 120 for correspondingly controlling the motor current of the driving motor 105 and the rotational direction thereof.

Now, referring to FIGS. 6 to 10, description will be made of the functional configurations and operations of the main CPU 106 and the subsidiary CPU 107 of the power steering control apparatus shown in FIG. 5.

Figure 6:
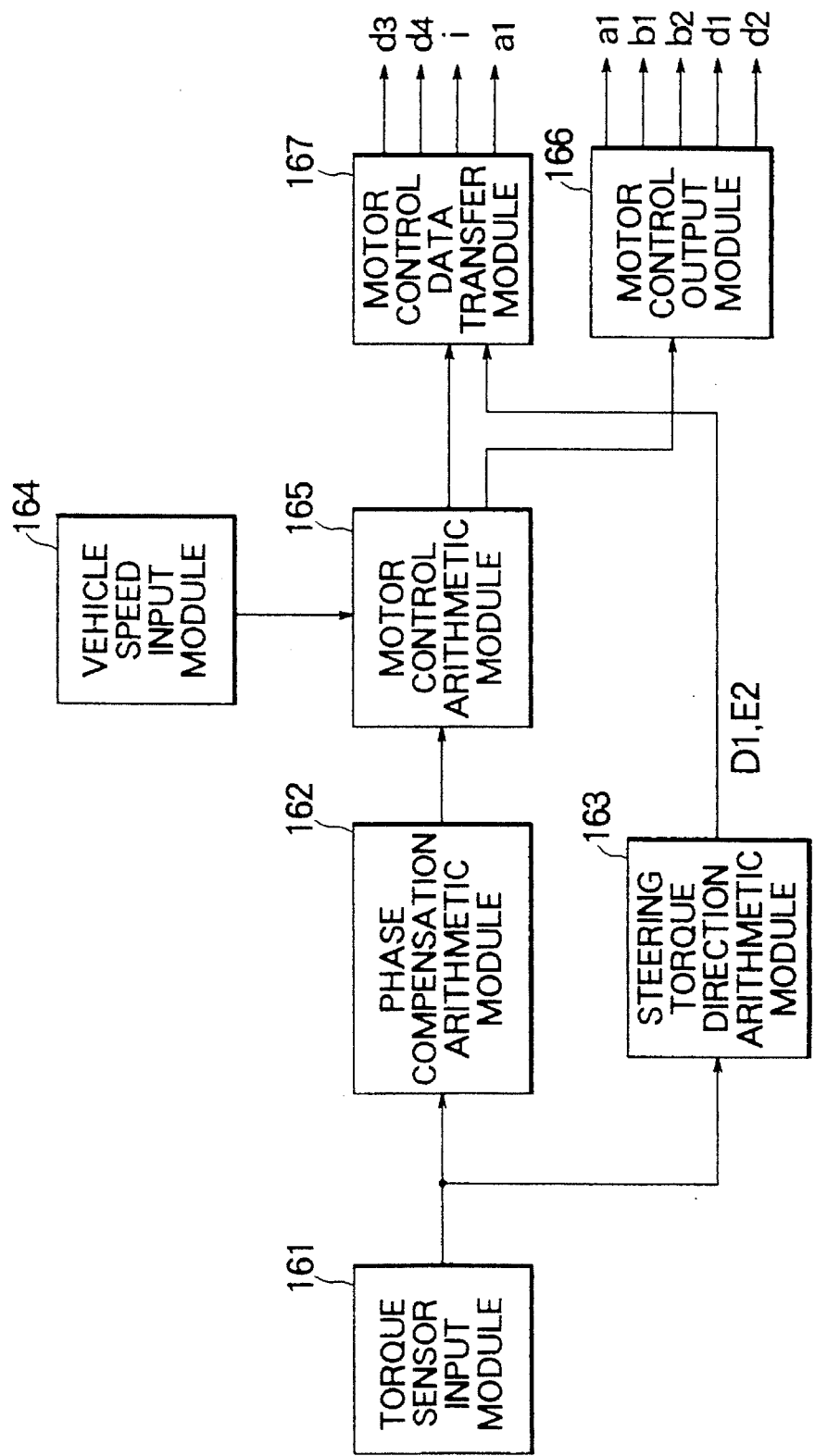
FIG. 6 is a block diagram showing schematically a functional structure of a main CPU of the control apparatus shown in FIG. 5.

FIG. 6 is a block diagram showing schematically a functional arrangement of the main CPU 106. Referring to the figure, the main CPU 106 is comprised of a torque sensor input module 161 for fetching from the torque sensor 103 via the interface circuit 109 the signal indicating the steering torque being applied to the steering wheel by the driver, a phase compensation arithmetic module 162 serving to compensate for advance or lag in phase of the steering torque signal brought about due to the damping or the like characteristics of the steering control loop to thereby ensure security and smoothness of operation of the power steering control apparatus, a steering torque direction arithmetic means 163 for determining the direction of the steering torque as applied to the steering wheel on the basis of the output signal from the torque sensor input module 161, a vehicle speed input module 164 for fetching the vehicle speed signal detected by the vehicle speed sensor 104, a motor control arithmetic module 165 for determining the driving direction (i.e., the direction in which the motor 105 is to be driven) and the driving current for the motor 105 and hence the torque to be generated thereby on the basis of the steering torque signal supplied from the phase compensation arithmetic module 162 and the vehicle speed signal supplied from the vehicle speed input module 164, a motor control output module 166 serving for generating the signals for enabling or inhibiting the current supply to the driving motor 105 as well as the signal b1 or b2 for controlling the motor current (and thus the motor torque) and the signal d1 or d2 for commanding the rotational direction on the basis of the output data of the motor control arithmetic module 165, and a motor control data transfer module 167 for sending to the subsidiary CPU 107 the signals d3 or d4, i and a11 mentioned hereinbefore which are generated on the basis of the outputs of the motor control arithmetic module 165.

On the other hand, the subsidiary CPU 107 is comprised of a torque input module for fetching from the output of the torque sensor 103 the signal indicative of the steering torque applied to the steering wheel of the motor vehicle, a vehicle speed input module for fetching from the output of the vehicle speed sensor 104 the signal indicative of the speed of the motor vehicle, a motor driving direction arithmetic module including a steering torque direction arithmetic module for determining the driving direction of the motor 105 on the basis of the steering torque and vehicle speed signal, a motor control data receiving module for receiving the motor control data (d3, d4, i and a11) transferred from the main CPU 106, a motor driving direction comparator module for comparing the motor driving direction data (d3 or d4) transferred from the main CPU 106 with the direction of the steering torque determined by the subsidiary CPU 107 itself, a motor power supply control module for issuing the control signal a22 of first logic level for enabling the power supply to the driving motor 105 in dependence on whether the state of coincidence or discrepancy resulting from the above-mentioned comparison continues for a predetermined period, a motor drive enable module for generating a motor drive enable signal (signal d5 or d6 of first logic level) on the basis of the motor driving data transferred from the main CPU 106, an abnormality decision module for determining a period during which the result of comparison performed by the above-mentioned comparison module continues to indicate the discrepancy, a discrepancy-state continuation decision module for determining continuation of the coincidence/discrepancy signal i, a motor power supply inhibit module for generating a signal (a2 of second logic level) inhibiting the power supply to the driving motor 105 when abnormality is decided, and a motor operation inhibiting module for generating a signal (d5 or d6 of second logic level) inhibiting the driving of the driving motor 105, although the component modules of the subsidiary CPU 107 enumerated above are omitted from illustration in the drawings.

Next, description will be directed to operation of the power steering control apparatus according to the instant embodiment by reference to FIGS. 7 to 10.

At first, the main CPU 106 fetches from the output of the torque sensor 103 a torque signal indicating the steering torque applied to the steering wheel of the motor vehicle in a step S101 while fetching a vehicle speed signal from the output of the vehicle speed sensor 104 in a step S102 for calculating on the basis of these signals the electric current to be supplied to the driving motor 105 as well as the driving direction thereof (or magnitude of the steering assist torque to be generated by the motor 105 and the direction thereof) in a step S104.

More specifically, in the steering torque direction arithmetic module 163 to which the torque sensor signal is inputted, a clockwise steering direction signal D1 of logically high level "1" is generated when steering torque is applied to the steering wheel by the driver for rotating the latter clockwise and when the torque exceeds a predetermined value T2, as illustrated in FIGS. 9A and 9B, while a counterclockwise steering direction signal E1 of level "1" is generated when the steering torque as applied to the steering wheel is of the counterclockwise direction and exceeds a predetermined value T1, as can be seen in FIGS. 9A and 9C. The output of the steering torque direction arithmetic module 163 is supplied to the motor control data transfer module 167.

Further, the phase compensation arithmetic module 162 to which the torque sensor signal is also inputted performs the phase compensation processing mentioned previously on the input signal to thereby output a phase-compensated torque signal to the motor control arithmetic module 165.

The motor control arithmetic module 165 arithmetically determines the PWM control signal b1 or b2 indicative of a target driving power P or motor current as well as the driving direction signals d1; d3 or d2; d4 on the basis of the torque sensor signal undergone the phase compensation, the vehicle speed signal supplied from the vehicle speed input module 164 and other steering information signals such as a signal indicating an angular position of the steering wheel, an angular speed signal of the steering wheel and the like in such a manner as illustrated in FIGS. 10A, 10B, and 10C, wherein the PWM control signal b1 or b2 and the driving direction signal d1 or d2 are supplied to the motor control output module 166. At the same time, the driving direction signal is also supplied to the motor control data transfer module 167, as the signal d3 or d4.

In this conjunction, it is assumed, by way of example, that the driving direction signals d1 and d3 are set to high level "1" when the driving motor 105 is to be rotated in the forward direction which corresponds to the clockwise rotation of the steering wheel, whereas when the driving motor 105 is to be driven in the backward direction, the driving direction signal d2 and d4 are set to high level " 1", respectively.

Parenthetically, in a step S103, same processing as mentioned hereinbefore in conjunction with the step S103 of the first embodiment and shown in FIG. 3 is performed.

The motor control data transfer module 167 determines whether or not the motor driving direction signal d3, d4 supplied from the motor control arithmetic module 165 coincides with the steering direction signal D1, E1 supplied from the steering torque direction arithmetic module 163 to thereby output the direction coincidence/discrepancy signal i, which is then supplied to the subsidiary CPU 107 together with the motor driving direction signal d3, d4 and the power supply enable signal a11 via the second data bus 112 (step S105). At this juncture, it should be mentioned that the driving direction signal d3 or d4 generated by the motor control arithmetic module 165 usually coincides with the steering direction signal generated by the steering torque direction arithmetic module 163. However, when abnormality or disturbance occurs in the module 165 or 163, the driving direction signal does not coincide with the steering direction signal. Additionally, if clockwise rotation of the steering wheel by the driver is immediately followed by transient rapid or steep rotation in the counterclockwise direction, discrepancy will transiently occur between the driving direction signal (output of the module 165) and the steering direction signal (output of the module 163) even when neither the module 165 nor the module 163 suffers abnormality, because of the time lag involved in generation of the driving direction signal (d3, d4) due to the phase compensation and the arithmetic operation performed by the modules 162 and 165. Needless to say, no abnormality decision should be made in the latter case. To this end, the coincidence/discrepancy signal i is generated by the motor control data transfer module 167 on the basis of the driving direction signal outputted from the arithmetic module 165 and the steering direction signal generated by the module 163. It is assumed that the direction coincidence/discrepancy signal i is at logical level "0" when coincidence is found between the steering direction signal and the motor driving direction signal while it assumes logical level "1" when discrepancy occurs between these two signals.

The motor control output module 166 applies the power supply enable signal a11 to an input of the AND circuit 113, the PWM torque signal b1 or b2 to an input of the AND circuit 114 or 115, and supplies the motor driving direction signal d1 or d2 directly to the motor drive control circuit 117, respectively, in a step S106.

On the other hand, the subsidiary CPU 107 fetches the torque sensor signal from the torque sensor 103 while fetching the vehicle speed signal from the vehicle speed sensor 104 (steps S111 and S112 in FIG. 8).

As mentioned hereinbefore, the subsidiary CPU 107 is poor in respect to the processing capability when compared with that of the main CPU 106. Accordingly, the former is not in the position to perform the complicated calculation for determining the motor control data as described above in conjunction with the main CPU 106, but determines forward (clockwise) driving direction signal D2 and a backward (counterclockwise) driving direction signal E2 substantially in the same manner as described hereinbefore by reference to FIGS. 9 and 10 with the aid of the motor driving direction arithmetic module incorporated in the subsidiary CPU 107 (step S113 in FIG. 8).

The motor control data receive module of the subsidiary CPU 107 receives the power supply enable signal a11, the driving direction signal d3 or d4 and the direction coincidence/discrepancy signal i via the second bus 112 from the main CPU 106 in every operation cycle thereof (e.g. upon every lapse of 1 ms). Upon reception of these signals, the subsidiary CPU 107 instantaneously generates the corresponding driving direction signal d5 or d6 to thereby allow the motor 105 to be rotated in the direction indicated by the driving direction signal d3 or d4 in cooperation with the AND circuit 114 or 115 (step S114 in FIG. 8).

The coincidence/discrepancy signal decision module of the subsidiary CPU 107 makes decision as to whether the direction coincidence/discrepancy signal i is in the state indicating discrepancy (step S115). When discrepancy is determined, then the abnormality duration decision module determines whether the state of discrepancy has continued for a predetermined time (e.g. 0.1 sec.). More specifically, decision is made as to whether the duration of the signal having logical level "1" exceeds a maximum value of duration of transient disturbance such as transient change-over of the rotational direction of the steering wheel as mentioned previously (step S120). Unless the maximum value is exceeded, it is decided that no abnormality takes place in the system including the interface circuit 109 and the main CPU 106. If otherwise, decision is made that the abnormality of concern takes place ("YES" of the step S120).

When it is decided in the step S115 that the signal i indicates coincidence or when it is determined in the step S120 that the system is normal although the signal indicates discrepancy, the motor driving direction comparison module compares the direction signal D2 or E2 indicating the direction of the steering torque as determined by the subsidiary CPU 107 itself with the motor driving direction signal d3 or d4 received from the main CPU 106 in a step S116. When coincidence is found between both the signals, a corresponding signal is supplied to the power supply enable module of the subsidiary CPU 107 (step S117). On the contrary, when discrepancy is detected, the abnormality duration decision module of the subsidiary CPU 107 checks whether the discrepancy state has continued for a predetermined time (e.g. 0.1 sec.) in a step S119. Unless the predetermined time or duration is exceeded, it is decided that the system operates normally, whereby a corresponding signal is supplied to the motor power supply enable module of the subsidiary CPU 107 (step S117). If otherwise, decision is made that abnormality takes place, whereby the motor power supply is inhibited by changing the logical level of the signal a22.

More specifically, when the coincidence/discrepancy signal i is logically "0", it is decided by the motor driving direction comparison module of the subsidiary CPU 107 that the system operates normally provided that the steering direction signal D2 and E2 generated by the CPU 107 coincides with the driving direction signal d3 or d4 sent from the CPU 106. Further, when the coincidence/discrepancy signal i is logically "1" only during a period which does not exceed the predetermined duration, discrepancy between the steering direction signal D2 or E2 and the driving direction signal d3 or d4 is interpreted or decided as indicating absence of any abnormality unless the discrepancy state continues for the predetermined time.

In this case, the motor power supply enable module of the subsidiary CPU 107 supplies the power supply enable signal a22 to the AND circuit 113 (step S117), while the motor control module of the subsidiary CPU 107 supplies the motor driving direction signal d5 or d6 to the AND circuit 114 or 115 as the motor drive control enable signal (step S118).

On the other hand, when abnormality is decided in the step S120 and/or S119 due to lapse of time longer than the predetermined duration, the motor power supply inhibit module of the subsidiary CPU 107 inhibits the power supply by inverting the logical level of the signal a22 applied to the AND circuit 113 (step S121), while the motor control inhibit module inhibits control operation of the motor driving circuit 117 by resetting the signal d5 or d6 applied to the AND circuit 114 or 115 (step S122).

As can now be understood from the foregoing description, according to the teachings of the invention incarnated in the second embodiment, the supply of the enable signal to the motor power supply control circuit 116 and hence the power supply to the motor 105 is inhibited, when the direction coincidence/discrepancy signal i indicating discrepancy continues to be issued from the main CPU 106 for a period longer than a predetermined time or when discrepancy between the driving direction signal sent from the main CPU 106 and the steering direction signal determined by the subsidiary CPU 107 is continuously detected over a time span longer than a predetermined value even when the discrepancy indicating signal disappears within a shorter period than the predetermined time. Thus, the reliability of operation of the power steering control apparatus can significantly be enhanced with a simplified and inexpensive circuit configuration. Further, the subsidiary CPU 107 which may have a lower processing capability than that of the main CPU 106 may be constituted by a commercially available inexpensive CPU. In this manner, high security can be ensured for the motor-driven steering control system by virtue of such arrangement that the electric power supply to the driving motor 105 is inhibited with the motor drive control operation being disabled when abnormal situation such as overrun of the main CPU 106 or the like disturbance thereof and/or various peripheral devices thereof continue for a predetermined period which exceeds a failsafe period of the power steering system, whereby adverse influence of abnormality or disturbance of the main CPU 106 and other components to the operation of the power steering system can positively be suppressed to a minimum.

Embodiment 3

In the case of the second embodiment of the invention described above, it is possible to diagnose the main CPU as to whether it or peripheral devices thereof suffer abnormality. However, no measures is provided for the abnormality diagnosis of the subsidiary CPU. A third embodiment of the present invention is directed to a power-steering control system having a fault or abnormality diagnosis function which allows the main CPU and the subsidiary CPU to diagnose each other.

Figure 11:
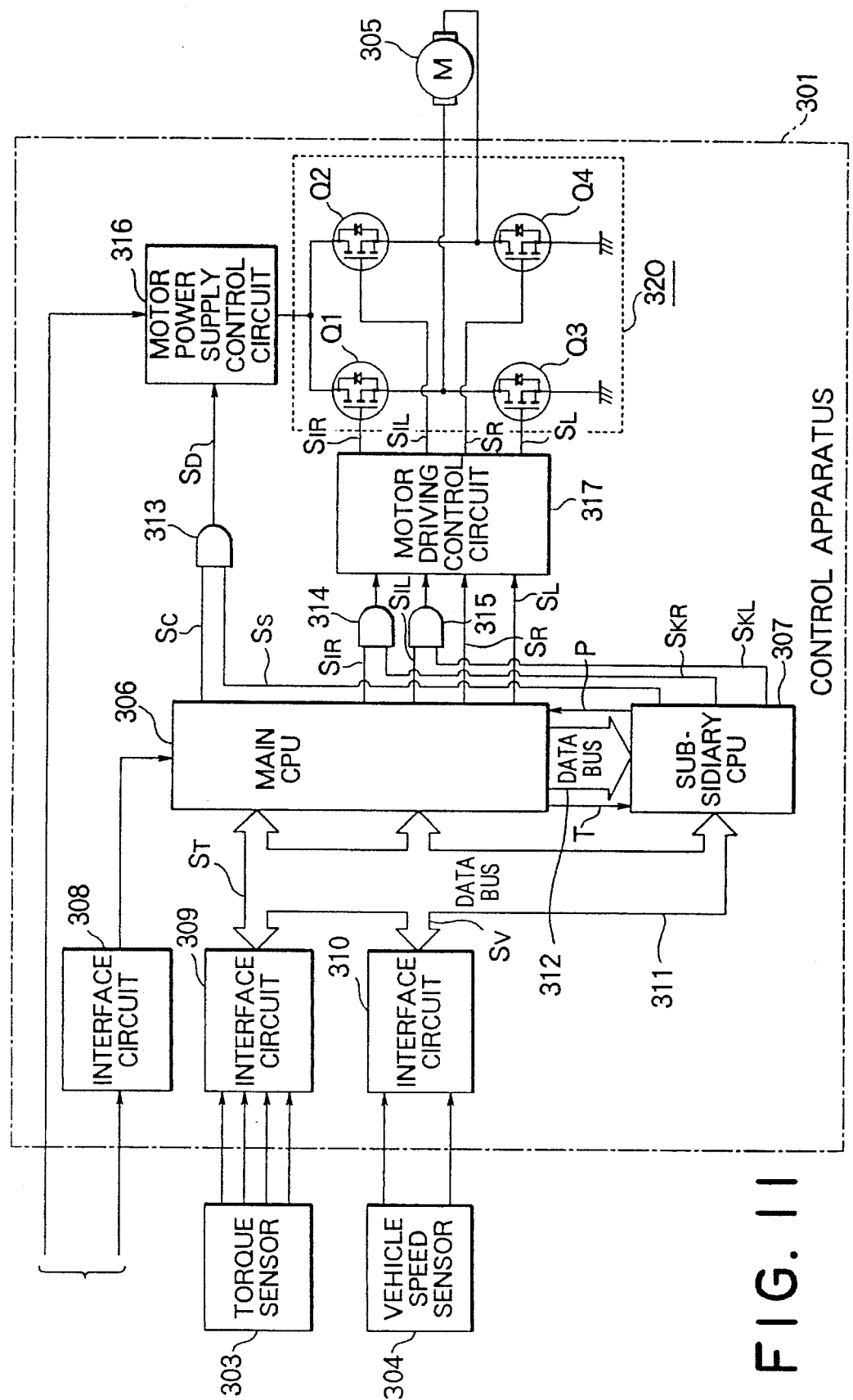
FIG. 11 is a schematic circuit diagram showing an arrangement of a power steering system incorporating a control apparatus according to a third embodiment of the present invention.

FIG. 11 shows in a schematic circuit block diagram a general arrangement of a motor-driven power steering control apparatus according to a third embodiment of the present invention. Referring to the figure, a control apparatus 301 is comprised of a main CPU 306, a subsidiary CPU 307 and peripheral devices thereof and serves for processing a steering torque signal $S_T$ fetched from a torque sensor 303 via an interface circuit 309 and a vehicle speed signal fetched from a vehicle speed sensor 304 through an interface circuit 310 to thereby control a driving current and a driving direction (clockwise or counterclockwise rotation, i.e., forward or backward rotation, to say in another way) of an electric motor 305 which in turn controls steering effort or torque to be applied to a steering wheel (not shown) for assisting a driver in manipulating the steering wheel.

More specifically, the main CPU 306 of the control apparatus 301 which serves as a main arithmetic unit generates on the basis of the steering torque signal $S_T$ and the vehicle speed signal $S_V$ a power supply command signal $S_C$ for controlling the power supply to the electric motor 305, a clockwise (forward) driving direction signal $S_R$ or a counterclockwise (backward) driving direction signal $S_L$ based on the result of aforementioned arithmetic operation performed on the motor driving direction signal as well as a clockwise driving current signal $S_{IR}$ or a counterclockwise driving current signal $S_{IL}$ which is given in the form of a PWM (pulse width modulation) control signal. On the other hand, the subsidiary CPU 307 serving as a subsidiary processor or arithmetic unit receives the clockwise driving direction signal $S_R$, the counterclockwise driving direction signal $S_L$ and the power supply command signal $S_C$ from the main CPU 306 via a data bus 312 to thereby convert these signals $S_R$, $S_L$ and $S_C$ into a clockwise driving enable signal $S_{KR}$, a counterclockwise driving enable signal $S_{KL}$ and a power supply control or enable signal $S_S$, respectively. The interface circuit 309 converts the output of the torque sensor 303 as inputted into a steering torque signal $S_T$ which is then supplied to the main CPU 306 and the subsidiary CPU 307 via a data bus 311. A second interface circuit converts sensor output fetched from the vehicle speed sensor 304 into a vehicle speed signal $S_V$ which is then supplied to the main CPU 306 and the subsidiary CPU 307 via the data bus 311. A constant voltage power supply circuit 308 which is supplied with a DC voltage from a battery (not shown) via a fuse (not shown either) delivers a stabilized constant voltage to the main CPU 306 and the subsidiary CPU 307.

As described hereinbefore in conjunction with the first and second embodiments, the subsidiary CPU 307 may be constituted by a processor which is poor in respect to the processing capability when compared with that of the main CPU 306 because the former simply serves for conversion of the clockwise driving direction signal $S_R$ or the counterclockwise driving direction signal $S_L$ and the power supply command signal $S_C$ received via the data bus 312 from the main CPU 306 into the clockwise driving enable signal $S_{KR}$ or the counterclockwise driving enable signal $S_{KL}$ and the power supply control signal $S_S$, respectively.

Furthermore, the control apparatus 301 includes a motor power supply control circuit 316 for supplying electric power to the electric motor 305 through an H-like bridge circuit 320 which is constituted by field effect transistors (hereinafter referred to as the FET) Q1 and Q2 having respective drain electrodes connected to power supply output terminal of the motor power supply control circuit 316 and FETs Q3 and Q4 having drains connected to the sources of the FETs Q1 and Q2, respectively, and having respective source electrodes connected to the ground potential, wherein armature terminals (not shown) of the motor 305 are connected, respectively, to a junction between the source of the FET Q1 and the drain of the FET Q3 and a junction between the source of the FET Q2 and the drain of the FET Q4. Additionally, the control apparatus 301 includes a motor drive control circuit 317 for receiving the clockwise driving current signal $S_{IR}$ or the counterclockwise driving current signal $S_{IL}$ from the main CPU 306 through an AND circuit 314 or 315 described below to thereby apply the clockwise driving current signal $S_{IR}$ or the counterclockwise driving current signal $S_{IL}$ to the gate of the FET Q1 or FET Q2 while supplying the clockwise driving direction signal $S_R$ or the counterclockwise driving direction signal $S_L$ from the CPU 306 to the gate of the FET Q3 or Q4. The AND circuit 314 supplies the clockwise driving current signal $S_{IR}$ to the motor drive control circuit 317 when the clockwise driving current signal $S_{IR}$ from the main CPU 306 is applied to one input and when the clockwise driving enable signal $S_{KR}$ of high level outputted from the subsidiary CPU 307 is applied to the other input terminal. The second AND circuit 315 outputs the counterclockwise driving current signal $S_{IL}$ to the motor drive control circuit 317 when the counterclockwise driving current signal $S_{IL}$ generated by the main CPU 306 is applied to one input thereof with the counterclockwise driving enable signal $S_{KL}$ of high level being simultaneously applied to the other input terminal from the subsidiary CPU 307. The third AND circuit 313 outputs a power supply enable signal $S_D$ to the motor power supply control circuit 316 in response to reception of both the power supply command signal $S_C$ of high level from the main CPU 306 and the power supply control signal $S_S$ of high level from the subsidiary CPU 307. The motor drive control circuit 317, the AND circuits 314, 315 and 313 and the FETs Q1 to Q4 cooperate to constitute a motor driving unit together with peripheral circuits of the CPUs 306 and 307.

In conjunction with the third embodiment, it is important to note that the main CPU 306 and the subsidiary CPU 307 perform a mutual abnormality diagnosis through arithmetic processing as well as fault diagnosis of the peripheral devices by processing correspondingly the steering torque signal $S_T$ and the vehicle speed signal $S_V$ inputted through the interface circuits 309 and 310, respectively. At this juncture, it should be understood that the phrase "mutual abnormality diagnosis" means a diagnosis performed on the basis of result of comparison between the driving direction signal of the motor 305 arithmetically determined by the subsidiary CPU 307 itself and the driving direction signal transferred from the main CPU 306. In that case, when discrepancy between both the driving signals mentioned above continues to exist longer than a predetermined time, e.g. 0.1 sec., it is determined that the main CPU 306 suffers from some abnormality.

As far as no abnormality takes place in the main CPU 306, the CPU 306 outputs a transfer trigger signal T to the CPU 307, which is then followed by transfer of the power supply command signal $S_C$ and the clockwise driving direction signal $S_R$ or the counterclockwise driving direction signal $S_L$ to the subsidiary CPU 307 via the data bus 312 as the motor control data. On the contrary, when abnormality occurs in the main CPU 306, the transfer of the motor control output data mentioned above is inhibited. In this case, occurrence of abnormality is informed to the subsidiary CPU 307. At the same time, the power supply command signal $S_C$ is set to low level and the supply of the clockwise driving current signal $S_{IR}$ or the counterclockwise driving current signal $S_{IL}$ as well as the clockwise driving direction signal $S_R$ or the counterclockwise driving direction signal $S_L$ to the motor drive control circuit 317 is stopped.

On the other hand, when no abnormality is detected as the result of the comparison-based diagnosis processing, the subsidiary CPU 307 sends to the main CPU 306 a periodical signal P which changes the signal level between the high level and the low level upon lapse of every operation cycle, while inputting the power supply control signal $S_S$ to one input terminal of the AND circuit 313 with one of the clockwise driving enable signal $S_{KR}$ and the counterclockwise driving enable signal $S_{KL}$ being applied to one input terminal of the AND circuit 314 or 315. Further, when the diagnostic results in detection of abnormality, sending of the period signal P to the main CPU 306 is interrupted to thereby inform the main CPU 306 of occurrence of abnormality. To this end, each of the main CPU 306 and the subsidiary CPU 307 is equipped with the send/receive means and the signal interrupting means.

Figure 12:
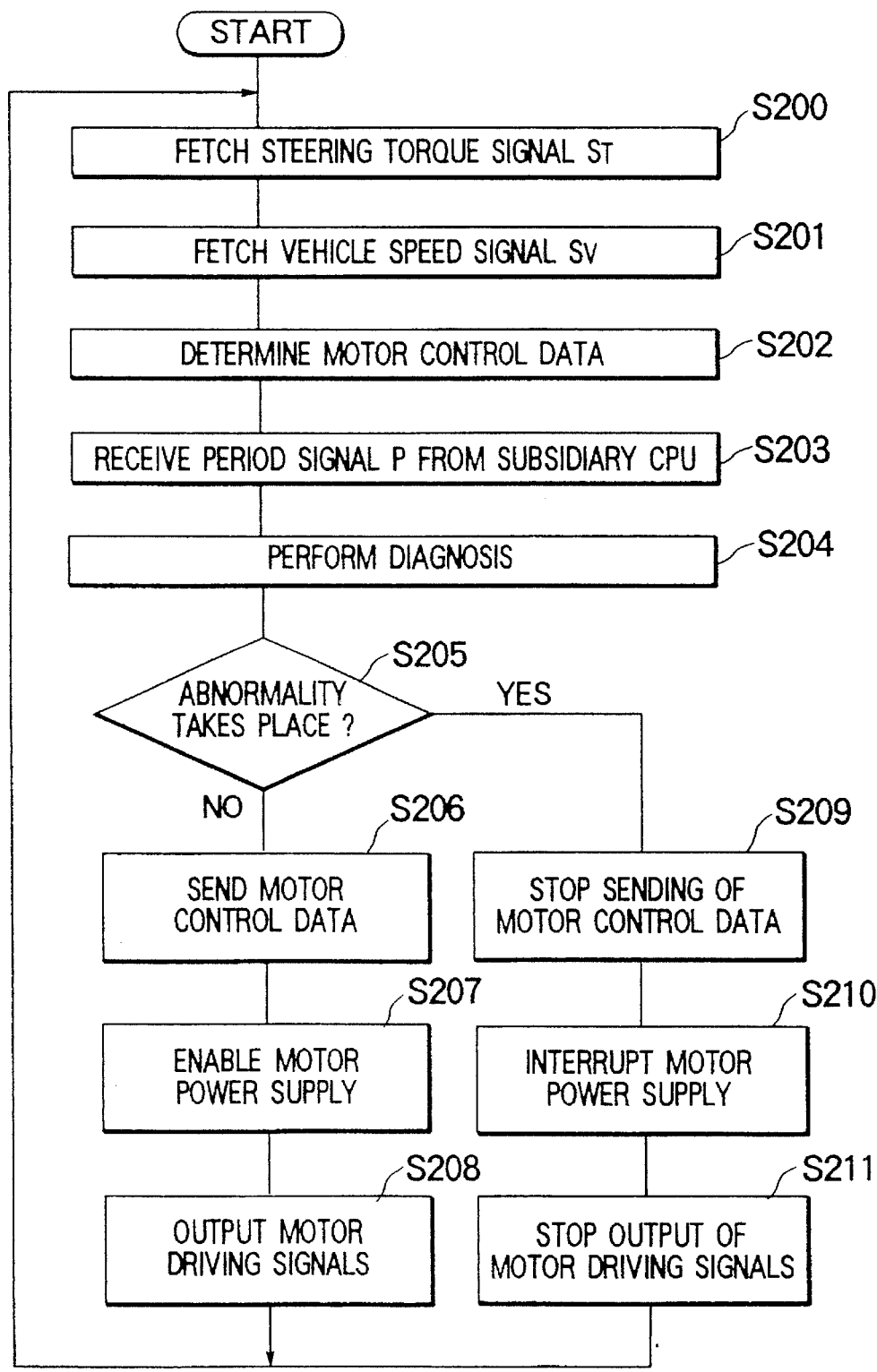
FIG. 12 is a flow chart for illustrating processing operation performed by a main processor (CPU) of the control apparatus shown in FIG. 11.

Next, description will be directed to operation of the power steering control apparatus according to the instant embodiment. FIGS. 12 and 13 are flow charts for illustrating operation of the control apparatus according to the third embodiment of the invention. In the first place, it is assumed that neither the main CPU 306 nor the subsidiary CPU 307 suffers from abnormality.

The main CPU 306 fetches the steering torque signal $S_T$ from the subsidiary CPU 307 and the vehicle speed signal $S_V$ from the vehicle speed sensor 304 via the interface circuits 309 and 310 serving as the input means, respectively, in steps S200 and S201.

On the basis of the steering torque signal $S_T$ and the vehicle speed signal $S_V$ as inputted, the main CPU 306 arithmetically determines the duty ratio of the PWM (pulse-width modulation) control signal representing, for example, the clockwise driving current signal $S_{IR}$ as well as the clockwise driving direction signal $S_R$ as the motor control output data signals (step S202). Subsequently, the subsidiary CPU 307 reads out data of the period signal P indicating the presence or absence of abnormality from a memory (not shown) in a step S203 to thereby perform abnormality diagnosis in a step S204. On the basis of the result of the abnormality diagnosis, decision is made whether or not abnormality or fault takes place in the subsidiary CPU 307 and others in a step S205. In this case, it is assumed that no abnormality takes place. Accordingly, the main CPU 306 sends the transfer trigger signal T to the subsidiary CPU 307 and subsequently the power supply command signal $S_C$ and the clockwise driving direction signal $S_R$ in a step S206.

After sending of the motor control output data as described above, the main CPU 306 supplies the power supply command signal $S_C$ of high level to the one input terminal of the AND circuit 313 because the diagnostic results in no abnormality (step S207) and additionally outputs as the motor drive signals the clockwise driving current signal $S_{IR}$ and the clockwise driving direction signal $S_R$ in a step S208. In this case, the FETs Q1 and Q4 have to be turned on in order to control rotation of the electric motor 305 in the clockwise direction. Accordingly, the clockwise driving current signal $S_{IR}$ is outputted to be applied to one input terminal of the AND circuit 314 with the clockwise driving direction signal $S_R$ being applied to the motor drive control circuit 317 in the step S208.

On the other hand, in parallel with the processing executed by the main CPU 306, the subsidiary CPU 307 fetches the steering torque signal $S_T$ from the torque sensor 303 via the interface circuit 309 and the vehicle speed signal $S_V$ from the vehicle speed sensor 304 via the interface circuit 310 in steps S300 and S301.

On the basis of the steering torque signal $S_T$ and the vehicle speed signal $S_V$ as inputted, the subsidiary CPU 307 arithmetically determines the motor driving direction (i.e., the direction in which the motor is to be driven) in a step S302. Subsequently, the subsidiary CPU 307 reads out from a memory (not shown) the data corresponding to the motor control output data sent from the main CPU 306 in a step S303 and checks whether the data as read out coincide with the motor control output data sent from the main CPU 306 on an operation cycle basis of the main CPU 306, to thereby effect the diagnosis as to whether or not the main CPU 306 suffers from abnormality or fault by comparing the clockwise driving direction signal $S_R$ transferred from the main CPU 306 with the clockwise driving direction signal determined by the subsidiary CPU 307 itself. In this manner, diagnosis is effected for the processing performed not only by the main CPU 306 but also by the subsidiary CPU 307 (step S304). On the basis of the result of this diagnosis, decision is made as to occurrence of abnormality (step S305). When it is decided that the system operates normally, the output level of the period signal P sent to the main CPU 306 is inverted, for example, from high to low level. The period signal P of low level is sustained till the succeeding operation cycle of the subsidiary CPU 307 (step S306).

Upon reception of the period signal P of low level, the main CPU 306 applies to one input of the AND circuit 313 the power supply control signal $S_S$ of high level for enabling the power supply to the motor power supply control circuit 316, the AND circuit 313 having the other input terminal supplied with the power supply command signal $S_C$ (step S307). In response to application of the power supply control signal $S_S$, the AND circuit 313 outputs the power supply enable signal $S_D$ of high level to the motor power supply control circuit 316 for enabling the power supply operation thereof. Besides, in order to allow the main CPU 306 to output the motor driving current signal, the subsidiary CPU 307 applies to one input terminal of the AND circuit 314 the clockwise driving enable signal $S_{KR}$ on the basis of the motor control data transferred from the main CPU 306, the AND circuit having the other input terminal to which the clockwise driving current signal $S_{IR}$ is applied from the main CPU 306 at this time point (step S308).

As a result, the motor drive control circuit 317 responds to the output of the AND circuit 314 to thereby apply to the gate electrode of the FET Q1 the clockwise driving current signal $S_{IR}$ having a predetermined duty ratio while applying the clockwise driving direction signal $S_R$ outputted from the main CPU 306 to the gate electrode of the FET Q4. Thus, the FET Q1 is repetitionally turned on and off at a frequency corresponding to the duty ratio of the clockwise driving current signal $S_{IR}$. On the other hand, the FET Q4 is maintained in the conducting state (on-state) so long as the clockwise driving direction signal $S_R$ is applied to the gate thereof. Consequently, an electric current flows from the motor power supply control circuit 316 through the FET Q1, the electric motor 305 and the FET Q4 to the ground.

It will readily be understood that as the duty ratio of the clockwise driving current signal $S_{IR}$ applied to the gate of the FET Q1 increases, the "ON" duration of the PWM pulse signal becomes longer, which in turn means that the period during which the FET Q1 remains in the conducting state is elongated and thus the motor current of the electric motor 305 as well as the steering assist torque generated thereby increases correspondingly. In this way, the torque of the electric motor 305 can be controlled by making variable the duty ratio of the clockwise driving current signal $S_{IR}$.

As will be apparent from the foregoing description, by virtue of the abnormality diagnoses performed through cooperation of the main CPU 306 and the subsidiary CPU 307, there can be realized high or enhanced reliability in the steering torque generation control effectuated by the electric motor 305 under the control of the main CPU 306 and the subsidiary CPU 307.

Next, description will be directed to the processing operation of the subsidiary CPU 307 in the case where occurrence of some fault or abnormality is decided by the main CPU 306. It is now assumed, by way of example, that the main CPU 306 determines occurrence of abnormality in the decision step S205 on the basis of the result of the abnormality diagnosis performed in the diagnosis step S204. In that case, the motor control data arithmetically determined by the main CPU 306 in the step S202 is inhibited from being transferred to the subsidiary CPU 307 (step S209). More specifically, the main CPU 306 interrupts transmission of the motor control data for a period longer than one operation cycle of the main CPU 306, to thereby inform the subsidiary CPU 307 of occurrence of abnormality.

In succession to the processing for stopping the sending of the motor control data, the main CPU 306 clears the power supply command signal $S_C$ applied to the AND circuit 313 to thereby stop power supply to the electric motor 305 in order to ensure reliability of the steering torque generation control (step S210). Additionally, in succession to the interruption of the clockwise driving current signal $S_{IR}$ applied to the AND circuit 314, supply of the clockwise driving direction signal $S_R$ to the motor drive control circuit 317 is interrupted, whereby the supply of the motor driving current to the electric motor 305 is positively prevented (step S211).

On the other hand, in the motor control data reception processing in the step S303, the subsidiary CPU 307 reads out motor control data from the memory not shown for the purpose of checking the content of the motor control data and executes the abnormality diagnosis processing in a step S304. When it is confirmed as a result of this diagnosis that the motor control data is not being transferred from the main CPU 306, the subsidiary CPU 307 then decides that some abnormality or fault takes place in the main CPU 306 and/or peripheral devices thereof (step S305).

Subsequently, the subsidiary CPU 307 sends the period signal P of low or high level to the main CPU 306 to thereby inform the main CPU 306 of the fact that the subsidiary CPU 307 itself stops the steering torque generation control processing. In succession, the subsidiary CPU 307 stops sending of the power supply control or enable signal $S_S$ to the AND circuit 313 to thereby execute the motor power supply stop processing step S310 while inhibiting the supply of the driving current to the electric motor 305 by clearing the clockwise driving enable signal $S_{KR}$ applied to the AND circuit 314 (step S311). In this manner, the motor power supply interruption processing as well as the motor control data inhibit processing effected by the main CPU 306 is redundantly reinforced by the subsidiary CPU 307.

Next, processing operation of the main CPU 306 will be described when occurrence of some failure or abnormality at the side of the subsidiary CPU 307 is decided. It is assumed that the subsidiary CPU 307 detects occurrence of abnormality in the diagnosis step S305. In that case, the transmission of the period signal P having fixed low or high level to the main CPU 306 is stopped (step S309), whereby occurrence of abnormality in the subsidiary CPU 307 and/or peripheral devices thereof is informed to the main CPU 306.

In succession to the processing for stopping the transmission of the period signal P, the subsidiary CPU 307 clears the power supply control signal $S_S$ applied to the AND circuit 313 to thereby interrupt the power supply to the electric motor 305 in a step S310. Additionally, the subsidiary CPU 307 stops application of the clockwise driving enable signal $S_{KR}$ to the AND circuit 314 to thereby inhibit the motor control data from being supplied by the main CPU 306 (step S311).

On the other hand, in the reception processing of the period signal P, the main CPU 306 reads out data of the period signal P from the memory not shown for confirming the content of the period signal P in the step S203, whereupon the abnormality diagnosis processing is performed in a step S204. When the result of this diagnosis indicates that the period signal P is not transmitted from the subsidiary CPU 307, the main CPU 306 determines that some abnormality takes place in the subsidiary CPU 307 and/or peripheral devices thereof (step S205).

Next, the main CPU 306 stops transfer of the motor control data to the subsidiary CPU 307 to inform the latter of the fact that the main CPU 306 stops the steering torque generation control processing (step S209). Subsequently, in order to ensure more positively interruption of the motor power supply as well as the motor control data from the subsidiary CPU 307, the main CPU 306 clears the power supply command signal $S_C$ from the AND circuit 313 to thereby stop the power supply to the electric motor 305 (step S210). Besides, in addition to the stoppage of the clockwise driving current signal $S_{IR}$ outputted to the AND circuit 314, the main CPU 306 interrupts the supply of the clockwise driving direction signal $S_R$ to the motor drive control circuit 317 to thereby stop the supply of the driving current to the electric motor 305 in a step S211.

As will now be understood from the foregoing description, according to the teachings of the invention incarnated in the third embodiment, not only the main CPU 306 stops the steering torque generation control upon detection of some fault or abnormality as the result of the abnormality detection but also the subsidiary CPU 307 executes the processing for stopping the steering torque generation control. In this manner, the reliability of the steering assist torque generation by the electric motor 305 can remarkably be enhanced by virtue of the fact that redundancy is provided by the subsidiary CPU 307 to complement the steering torque generation control performed by the main CPU 306 even when the torque generation stop processing of the main CPU 306 is insufficient or incomplete because of abnormality taking place in the main CPU 306.

Many features and advantages of the present invention are apparent from the detailed description and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. A control apparatus for a motor-driven power steering system of a motor vehicle, wherein said motor-driven power steering system includes an electric motor connected to a main power supply source for generating an assist torque for facilitating manipulation of a steering wheel of said motor vehicle, said control apparatus comprising:

a motor power supply control circuit for controlling power supply to said electric motor from said main power supply source;

torque sensor means for detecting a steering torque applied to a steering mechanism of said motor vehicle;

vehicle speed sensor means for detecting a vehicle speed of said motor vehicle;

first processor means operatively connected to at least said torque sensor means and said vehicle speed sensor means, for arithmetically determining an assist torque to be generated by said electric motor on the basis of outputs of said torque sensor means and said vehicle speed sensor means and a driving direction in which said motor is to be driven on the basis of outputs of said torque sensor means to thereby generate an assist torque signal and a first driving direction signal, respectively, said first processor means further generating a first power enable signal;

motor drive control means operatively connected to said first processor means for controlling operation of said electric motor in accordance with said assist torque signal and said first driving direction signal supplied from said first processor means;

second processor means operatively connected to said torque sensor means and said first processor means and receiving said first driving direction signal and said first power enable signal from said first processor means for determining whether said first driving direction signal supplied from said first processor means coincides with a driving direction indicated by said torque sensor for generating a second driving direction signal, said second processor means further generating a second power enable signal, said second power enable signal being set to same logic level as that of said first power enable signal when said first driving direction is determined to coincide with said driving direction indicated by said torque signal, and being set to an opposite logic level from said first power enable signal when said first driving direction is determined not to coincide with said driving direction indicated by said torque signal; and logic means operatively connected to outputs of said first processor means and said second processor means and an input side of said motor drive control means for enabling control operation thereof when said torque assist signal supplied from said first processor means and said second driving direction signal supplied from said second processor means are of the same logical sense, said logic means receiving said first and second power enable signals and enabling said motor power supply control circuit when said first and second power enable signals are of same logical sense.

2. A control apparatus according to claim 1, wherein said motor power supply control circuit includes a switching element which is turned on or off in response to output of said logic means to thereby allow power supply to said electric motor from said main power supply source only when the output of said logic means indicates that said first power enable signal from said first processor means and said second power enable signal from said second processor means are of same logical sense.

3. A control apparatus according to claim 1, wherein said electric motor is supplied with electric power from said main power supply source in the form of a pulse current having a duty circle controlled by a switching circuit which in turn is controlled by a pulse width modulation signal generated by said motor drive control means in accordance with said assist torque signal and said driving direction signal supplied from said first processor means when control operation of said motor drive control means is enabled.

4. A control apparatus according to claim 1, further comprising a switching circuit including a pair of first and second switching circuitries for driving exchangeably said electric motor in either one rotational direction thereof or other rotational direction reverse to said one direction.

5. A control apparatus according to claim 1, wherein said logic means includes a logical product means for determining a logical product of said assist torque signal supplied from said first processor means and the output signal supplied from said second processor means, said output signal indicating result of said comparison performed by said second processor means;

said second logical product means enabling operation of said motor drive control means in dependence on said logical product to thereby inhibit operation of said motor drive control circuit unless said assist torque signal and said output signal logically coincide with each other.

6. A control apparatus according to claim 1, wherein said second processor means further generates a third driving direction signal on the basis of output of said torque sensor means, said assist torque signal comprising a first assist torque signal indicating a first rotational direction and a second assist torque signal indicating a second rotational direction which is opposite to said first rotational direction, and wherein said logic means includes a pair of first and second AND circuits;

said first AND circuit receiving said first assist torque signal from said first processor means and said second driving direction signal from said second processor means for generating a logical product signal for enabling operation of said motor drive control circuit when said first assist torque signal and said second driving direction signal are of same logical sense;

said second AND circuit receiving said second assist torque signal from said first processor means and said third driving direction signal from said second processor means for generating a logical product signal for enabling operation of said motor drive control circuit when said second assist torque signal and said third driving direction signal are of same logical sense.

7. A control apparatus according to claim 6, wherein said electric motor is supplied with electric power from said main power supply source in the form of a pulse current having a duty circle controlled by a switching circuit which in turn is controlled by a pulse modulation signal generated by said motor drive control means in accordance with said assist torque signal and said driving direction signal supplied from said first processor means when control operation of said motor drive control means is enabled.

8. A control apparatus according to claim 6, further comprising a switching circuit including a pair of first and second switching circuitries for driving exchangeably said electric motor in either one rotational direction thereof or other rotational direction reverse to said one direction.

9. A control apparatus for a motor-driven power steering system of a motor vehicle, wherein said motor-driven power steering system includes an electric motor electrically connected to a main power supply source for generating an assist torque for facilitating manipulation of a steering wheel of said motor vehicle, said control apparatus comprising:

torque sensor means for detecting a steering torque applied to a steering mechanism of said motor vehicle;

vehicle speed sensor means for detecting a vehicle speed of said motor vehicle;

first processor means operatively connected to said torque sensor means and said vehicle speed sensor means for arithmetically determining an assist torque to be generated by said electric motor and a driving direction in which said motor is to be driven on the basis of outputs of said torque sensor means and said vehicle speed sensor means to thereby generate an assist torque signal, a motor driving direction signal and a coincidence/discrepancy signal representing coincidence or discrepancy between said motor driving direction signal and a first steering direction signal indicating a direction of said steering torque;

motor drive control means operatively connected to said first processor means for controlling drive of said electric motor in accordance with said assist torque signal and said motor driving direction signal supplied from said first processor means;

second processor means operatively connected to said torque sensor means and said first processor means and supplied with said coincidence/discrepancy signal and said motor driving direction signal from said first processor means, said second processor means deciding whether the logical levels of said motor driving direction signal and a second steering direction signal generated by said second processing means from a signal of said torque sensor means are the same, and measuring the temporal duration of the period during which the logical levels of said motor driving direction signal and said second steering direction signal are different, to thereby supply to said motor drive control means an inhibit signal for inhibiting supply of said assist torque signal to said motor drive control means from said first processor means when said measured temporal duration exceeds a predetermined value.

10. A control apparatus according to claim 9, wherein said second processor means includes means for inhibiting at least one of electric power supply to said motor and supply of said assist torque signal to said motor driving circuit when said decision results in that said discrepancy state has continued for a duration which exceeds a predetermined value.

11. A control apparatus according to claim 9, wherein said first processor means includes:

motor control arithmetic means for generating said assist torque signal and said motor driving direction signal on the basis of the outputs of said torque sensor means and said vehicle speed sensor means;

steering torque direction arithmetic means for generating a first steering direction signal on the basis of the output of said torque sensor means independent of said motor control arithmetic means;

motor control output means for supplying said assist torque signal and said motor driving direction signal to said motor drive control means; and motor control signal transfer means connected to the outputs of said motor control arithmetic means and said steering direction arithmetic means for sending said motor driving direction signal and said coincidence/discrepancy signal to said second processor means;

wherein said motor control signal transfer means includes comparison means for comparing said motor driving direction signal supplied from said motor control arithmetic means with said first steering direction signal supplied from said steering torque direction arithmetic means to thereby set said coincidence/discrepancy signal to first or second logical level representing coincidence or discrepancy between said motor driving direction signal and said first steering direction signal.

12. A control apparatus according to claim 11, wherein said second processor means includes:

motor control data receiving means for receiving said motor driving direction signal and said coincidence/discrepancy signal;

first decision means for deciding whether said coincidence/discrepancy signal is at a level indicating said discrepancy state;

second decision means responsive to decision of said first decision means that said coincidence/discrepancy signal indicates said discrepancy state, to thereby decide whether said discrepancy state has continued longer than a predetermined duration; and output means for generating a signal for inhibiting at least one of said electric power supply to said motor and supply of said assist torque signal to said motor drive control means when it is decided by said second decision means that said discrepancy state has continued longer than a predetermined duration.

13. A control apparatus according to claim 12, wherein said second processor means includes:

steering direction arithmetic means for generating a second steering direction signal indicative of direction of torque applied to said steering wheel on the basis of output of said torque sensor means;

comparison means for comparing said second steering direction signal with said motor driving direction signal supplied from said first processor means for thereby deciding whether or not said second steering direction signal coincides with said motor driving direction signal;

third decision means responsive to decision of said comparison means that said second steering direction signal does not coincide with said motor driving direction signal to thereby decide whether discrepancy state in which said second steering direction signal does not coincide with said motor driving direction signal has continued longer than a second predetermined duration; and output means for generating a signal inhibiting at least one of electric power supply to said motor or supply of said assist torque signal to said motor drive control means when decision made by said second decision means is affirmative.

14. A control apparatus according to claim 13, wherein said second and third decision means cooperate to constitute means for enabling said electric power supply to said motor and said supply of said assist torque signal to said motor drive control means even when said motor driving direction signal and said second steering signal do not coincide with each other, so long as said coincidence/discrepancy signal indicates said discrepancy state.

15. A control apparatus according to claim 9, further comprising:

logic means operatively connected to outputs of said first processor means and said second processor means and input side of said motor drive control means for enabling control operation of said motor drive control means when said torque assist signal supplied from said first processor means and said second driving direction signal supplied from said second processor means logically coincide with each other.

16. A control apparatus according to claim 9, further comprising:

a constant voltage power supply circuit connected to a main power supply source for supplying an electric power of a constant voltage to said first processor means and said second processor means; and a motor power supply control circuit for controlling power supply to said electric motor from said main power supply source;

wherein said first processor means includes first voltage signal generating means for generating a first voltage signal indicative of an output voltage of said constant voltage power supply circuit;

said first voltage signal being transferred to said second processor means and at the same time outputted to said logic means;

said second processor means includes second voltage signal generating means for generating a second voltage signal indicative of the output voltage of said constant voltage power circuit supplied to said second processor means and comparison means for comparing said first voltage signal with said second voltage signal to thereby generate an output signal when said comparison shows coincidence between said first and second voltage signals; and wherein said logic means includes first logical product means for generating a signal for enabling power supply to said electric motor from said main power supply source through said motor power supply control circuit when an output signal of said first logical product means indicates logical coincidence between said first voltage signal supplied from said first processor means and said output signal supplied from said second processor means.

17. A control apparatus according to claim 10, wherein said electric motor is supplied with electric power from said main power supply source in the form of a pulse current having a duty circle controlled by a switching circuit which in turn is controlled by a pulse modulation signal generated by said motor drive control means in accordance with said assist torque signal and said driving direction signal supplied from said first processor means when control operation of said motor drive control means is enabled.

18. A control apparatus according to claim 9, wherein said logic means includes second logical product means for determining a logical product of said assist torque signal supplied from said first processor means and the output signal supplied from said second processor means, said output signal indicating result of said comparison performed by said second processor means;

said second logical product means enabling operation of said motor drive control means in dependence on said logical product to thereby inhibit operation of said motor drive control circuit unless said assist torque signal and said output signal logically coincide with each other.

19. A control apparatus for a motor-driven power steering system of a motor vehicle, wherein said motor-driven power steering system includes an electric motor connected to a main power supply source for generating an assist torque for assisting a driver in manipulating a steering wheel of said motor vehicle, said control apparatus comprising:

torque sensor means for detecting a steering torque applied to said steering wheel by the driver;

vehicle speed sensor means for detecting a speed of said motor vehicle;

main processor means and subsidiary processor means for determining driving control information for said electric motor for thereby controlling said assist torque generated by said electric motor on the basis of driving information of said motor vehicle supplied externally, said main and subsidiary processor means cooperating to mutually diagnose occurrence of abnormality in said main and subsidiary processor means and devices connected thereto on the basis of results of said arithmetic determination; and motor driving means for outputting motor driving signals for driving said electric motor on the basis of the driving control information outputted from said main processor means and said subsidiary processor means;

wherein each of said main processor means and said subsidiary processor means includes:

signal send/receive means for allowing a signal indicative of the result of said abnormality diagnosis to be transferred between said main processor means and said subsidiary processor means; and signal interrupt means for interrupting supply of said driving control information to said motor driving means from said main processor means or alternatively from said subsidiary processor means when said diagnostic result indication signal as received indicates occurrence of abnormality in at least one of said main processor means and said subsidiary processor means wherein said main processor means further includes:

first arithmetic means for arithmetically determining said motor driving current control information and said motor driving direction information on the basis of a steering torque signal fetched from the output of said torque sensor means and a vehicle speed sensor signal fetched from the output of said vehicle speed sensor means;

signal transfer means for sending at least said motor driving direction information to said second processor means; and first memory means for storing said motor driving direction information and said motor driving current information;

said second processor means further including:

second arithmetic means for arithmetically determining second motor driving direction information on the basis of said steering torque signal;

comparison means for comparing said motor driving direction information determined by said second arithmetic means with the motor driving direction information received from said main processor means;

diagnosis means for deciding whether abnormality occurs in said first processor means and devices connected thereto on the basis of result of said comparison to thereby generate said diagnostic result indication signal indicting occurrence of abnormality when said decision results in affirmation;

wherein said signal interrupt means of said subsidiary processor means is activated in response to said diagnostic result signal indicating occurrence of abnormality; and wherein said diagnostic result signal is transferred to said first processor means through said signal send/receive means.

20. A control apparatus according to claim 19, wherein said main processor means further includes:

first diagnosis means which responds to said diagnostic result signal received from said second processor means to thereby decide whether abnormality takes place in said main processor and/or the devices associated therewith on the basis of said motor driving current control information and said motor driving direction information stored in said memory as well as corresponding information arithmetically determined on the basis of steering torque signal and vehicle speed signal fetched from outputs of said steering torque sensor means and said vehicle speed sensor means, respectively, in succession to the reception of said diagnostic result signal; and first inhibit means for inhibiting operation of said motor driving means when occurrence of abnormality is decided by said first diagnosis means.

21. A control apparatus according to claim 20, wherein said main processor means further includes:

decision means for deciding that abnormality takes place in said subsidiary processor means and/or devices associated therewith when result of the decision performed by said first diagnosis means shows that no abnormality is taking place in said main processor means and/or devices provided in association with said main processor means; and means for inhibiting said driving control information from being transferred to said subsidiary processor means.

* * * * *